United States Patent
Jeong et al.

(10) Patent No.: US 12,108,034 B2
(45) Date of Patent: *Oct. 1, 2024

(54) IMAGE ENCODING AND DECODING METHOD USING BIDIRECTIONAL PREDICTION, AND IMAGE ENCODING AND DECODING APPARATUS

(71) Applicant: SAMSUNG ELECTRONICS CO., LTD., Suwon-si (KR)

(72) Inventors: Seungsoo Jeong, Suwon-si (KR); Gahyun Ryu, Suwon-si (KR); Minsoo Park, Suwon-si (KR); Minwoo Park, Suwon-si (KR); Kiho Choi, Suwon-si (KR); Narae Choi, Suwon-si (KR); Woongil Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,610

(22) Filed: Jul. 3, 2023

(65) Prior Publication Data
US 2023/0353727 A1 Nov. 2, 2023

Related U.S. Application Data

(63) Continuation of application No. 17/294,164, filed as application No. PCT/KR2019/015654 on Nov. 15, 2019, now Pat. No. 11,716,460.
(Continued)

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/177* (2014.11); *H04N 19/91* (2014.11)

(58) Field of Classification Search
None
See application file for complete search history.

(56) References Cited

U.S. PATENT DOCUMENTS 10,687,053 B2 6/2020 Jun et al.
11,716,460 B2 * 8/2023 Jeong ................... H04N 19/177
375/240.02
(Continued)

FOREIGN PATENT DOCUMENTS

CN 108353166 A 7/2018
KR 10-2016-0088085 A 7/2016
(Continued)

OTHER PUBLICATIONS

Chen et al., "Generalized bi-prediction for inter coding," Joint Video Exploration Team (JVET) of ITU-T SG 16 WP 3 and ISO/IEC JTC 1/SC 29/WG 11, Document: JVET-C0047, Saved May 17, 2016, Total 4 pages.
(Continued)

*Primary Examiner* — Kaitlin A Retallick
(74) *Attorney, Agent, or Firm* — Sughrue Mion, PLLC

(57) ABSTRACT

Disclosed is an image decoding method according to an embodiment, the image decoding method including: obtaining a first reference block and a second reference block, for bi-directional prediction of a current block; obtaining, from a bitstream, weight information for combining the first reference block with the second reference block; performing entropy decoding on the weight information to obtain a weight index; combining the first reference block with the second reference block according to a candidate value indicated by the weight index among candidate values
(Continued)

included in a weight candidate group; and reconstructing the current block based on a result of the combining, wherein a first binary value corresponding to the weight index is entropy-decoded based on a context model, and the remaining binary value corresponding to the weight index is entropy-decoded by a bypass method.

3 Claims, 32 Drawing Sheets

Related U.S. Application Data

(60) Provisional application No. 62/768,193, filed on Nov. 16, 2018.

(51) Int. Cl.
*H04N 19/176* (2014.01)
*H04N 19/177* (2014.01)
*H04N 19/91* (2014.01)

(56) References Cited

U.S. PATENT DOCUMENTS

| | | | |
|---|---|---|---|
| 2018/0309990 A1 | 10/2018 | Alshina et al. | |
| 2018/0332298 A1* | 11/2018 | Liu | H04N 19/70 |
| 2019/0158835 A1* | 5/2019 | Lee | H04N 19/107 |
| 2020/0169746 A1 | 5/2020 | Jeong et al. | |
| 2021/0266595 A1* | 8/2021 | Su | H04N 19/70 |
| 2021/0377534 A1 | 12/2021 | Lee | |
| 2022/0014730 A1* | 1/2022 | Jeong | H04N 19/177 |
| 2023/0344991 A1* | 10/2023 | Jeong | H04N 19/159 |
| 2023/0353727 A1* | 11/2023 | Jeong | H04N 19/463 |
| 2023/0353728 A1* | 11/2023 | Jeong | H04N 19/91 |
| 2023/0353729 A1* | 11/2023 | Jeong | H04N 19/105 |

FOREIGN PATENT DOCUMENTS

| | | |
|---|---|---|
| KR | 10-2017-0078672 A | 7/2017 |
| KR | 10-2018-0005119 A | 1/2018 |
| KR | 10-2018-0055761 A | 5/2018 |
| WO | 2017/086738 A1 | 5/2017 |
| WO | 2018/008904 A2 | 1/2018 |
| WO | 2018/066993 A1 | 4/2018 |

OTHER PUBLICATIONS

Communication dated Feb. 27, 2020, issued by the International Searching Authority in counterpart International Application No. PCT/KR2019/015654 (PCT/ISA/220, 210, 237).
Communication dated Jan. 4, 2023, issued by the India Intellectual Property Office in Indian Patent Application No. 202127022701.
Communication dated Mar. 10, 2023, issued by the Korean Intellectual Property Office in Korean Patent Application No. 10-2021-7004597.
Su et al., "CE4-related: Generalized bi-prediction improvements combined from JVET-L0197 and JVET-L0296," Joint Video Experts Team (JVET) of ITU-T SG 16 WP 3 and ISO/IEC JTC 1/SC 29/WG 11, Document: JVET-L0646-v5, Oct. 17, 2018, Total 6 pages.
Communication dated Sep. 21, 2023 issued by the Korean Intellectual Property Office in counterpart Korean Application No. 10-2021-7004597.
Eun-kyung Ryu et al, HEVC Entropy coding technology trend, Journal of the IEIE, vol. 38 No. 8, pp. 56-65.
Chinese Office Action dated Jan. 23, 2024 in Chinese Application No. 201980075617.0.

\* cited by examiner

FIG. 13

| BLOCK SHAPE DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

| Syntax element | binIdx | | | | | |
|---|---|---|---|---|---|---|
| | 0 | 1 | 2 | 3 | 4 | >=5 |
| Bcw_idx | 0 | bypass | bypass | bypass | na | na |

FIG. 24

| BINARY STRING | INDEX | CANDIDATE VALUE |
|---|---|---|
| 0 | 0 | 4 |
| 10 | 1 | 5 |
| 110 | 2 | 3 |
| 1110 | 3 | 10 |
| 1111 | 4 | −2 |

| CANDIDATE VALUE | ACCUMULATIVE SELECTION NUMBER OF TIMES |
|---|---|
| 4 | 19 |
| 5 | 6 |
| 3 | 12 |
| 10 | 3 |
| -2 | 7 |

| INDEX | CANDIDATE VALUE |
|---|---|
| 0 | 4 |
| 1 | 3 |
| 2 | -2 |
| 3 | 5 |
| 4 | 10 |

FIG. 28

| BINARY STRING | INDEX | CANDIDATE VALUE |
|---|---|---|
| 0 | 0 | 4 |
| 10 | 1 | 5 |
| 11 | 2 | 10 |

IMAGE ENCODING AND DECODING METHOD USING BIDIRECTIONAL PREDICTION, AND IMAGE ENCODING AND DECODING APPARATUS

CROSS-REFERENCE TO RELATED APPLICATIONS

This is a Continuation application of U.S. application Ser. No. 17/294,164 filed May 14, 2021, which is a National Stage of International Application No. PCT/KR2019/015654 filed Nov. 15, 2019, which claims benefit of U.S. Provisional No. 62/768,193 filed on Nov. 16, 2018 in the United States Patent and Trademark Office. The disclosures of which are incorporated herein by reference in their entireties.

TECHNICAL FIELD

The disclosure relates to the image encoding and decoding field. More particularly, the disclosure relates to an image encoding method and apparatus and an image decoding method and apparatus, using bi-directional prediction.

BACKGROUND ART

In image encoding and decoding, an image is split into blocks, and each block is prediction-encoded and prediction-decoded through inter prediction or intra prediction.

Intra prediction is a method of removing spatial redundancy in images to compress the images, and inter prediction is a method of removing temporal redundancy between images to compress the images. A representative example of inter prediction is motion estimation coding. Motion estimation coding predicts blocks of a current image by using a reference image. A reference block that is most similar to a current block is searched within a preset search range by using a preset evaluation function. The current block is predicted based on the reference block, and a prediction block generated as the predicted result is subtracted from the current block to generate a residual block. The residual block is then encoded. To more accurately perform the prediction, interpolation is performed on the reference image to generate pixels in a sub pel unit that is smaller than an integer pel unit, and inter prediction is performed based on the pixels in the sub pel unit.

In a codec, such as H.264 Advanced Video Coding (AVC) and High Efficiency Video Coding (HEVC), motion vectors of previously encoded blocks adjacent to a current block or blocks included in previously encoded images are used as prediction motion vectors of the current block in order to predict a motion vector of the current block. Differential motion vectors, which are differences between motion vectors of the current block and the prediction motion vectors, are signaled to a decoder side through a preset method.

DESCRIPTION OF EMBODIMENTS

Technical Problem

According to a technical object, an image decoding apparatus and method and an image encoding apparatus and method, according to an embodiment, may enable image encoding and decoding with a low bit rate by reducing a size of residual data.

Also, according to another technical object, an image decoding apparatus and method and an image encoding apparatus and method, according to an embodiment, may achieve simplification of entropy encoding and entropy decoding of data included in a bitstream.

Solution to Problem

According to an embodiment, an image decoding method using bi-directional prediction includes: obtaining a first reference block in a first reference image and a second reference block in a second reference image for bi-directional prediction of a current block; obtaining weight information for combing the first reference block with the second reference block from a bitstream; performing entropy decoding on the weight information to obtain a weight index; combining the first reference block with the second reference block according to a candidate value indicated by the weight index among candidate values included in a weight candidate group; and reconstructing the current block based on a result of the combining, wherein a first binary value corresponding to the weight index is entropy-decoded based on a context model, and the remaining binary value corresponding to the weight index is entropy-decoded by a bypass method.

Advantageous Effects of Disclosure

An image decoding apparatus and method and an image encoding apparatus and method, according to an embodiment, may encode and decode images with a low bit rate by reducing a size of residual data.

Also, an image decoding apparatus and method and an image encoding apparatus and method, according to an embodiment, may simplify entropy encode and entropy decode data included in a bitstream.

It should be noted that effects that can be achieved by the image decoding apparatus and method and the image encoding apparatus and method according to the embodiment are not limited to those described above, and other effects not mentioned will be apparent to one of ordinary skill in the art from the following descriptions.

BRIEF DESCRIPTION OF DRAWINGS

A brief description of each drawing is provided for better understanding of the drawings cited herein.

FIG. 13 illustrates a process of determining a depth of a coding unit as a shape and size of the coding unit change, when the coding unit is recursively split such that a plurality of coding units are determined, according to an embodiment.

FIG. 19 illustrates other shapes of coding units that may be determined based on split shape mode information that may be expressed with a binary code, according to an embodiment.

FIG. 23 is a reference table for determining context information of a binary string corresponding to a weight index.

FIG. 24 is a table showing candidate values included in a weight candidate group, and weight indexes and binary strings corresponding to the candidate values.

FIG. 28 is a table showing candidate values included in a weight candidate group, and weight indexes and binary strings corresponding to the candidate values.

BEST MODE

Figure 1:
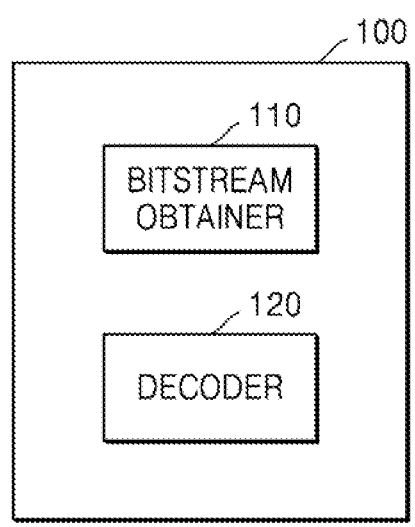
FIG. 1 is a block diagram of an image decoding apparatus according to an embodiment.

According to an embodiment, an image decoding method using bi-directional prediction includes: obtaining a first reference block in a first reference image and a second reference block in a second reference image for bi-directional prediction of a current block; obtaining weight information for combing the first reference block with the second reference block from a bitstream; obtaining a weight index by entropy decoding the weight information; combining the first reference block with the second reference block according to a candidate value indicated by the weight index among candidate values included in a weight candidate group; and reconstructing the current block based on a result of the combining, wherein a first binary value corresponding to the weight index is entropy-decoded based on a context model, and the remaining binary value corresponding to the weight index is entropy-decoded by a bypass method.

The image decoding method may further include adaptively determining a number of the candidate values included in the weight candidate group, based on at least one of a Picture Order Count (POC) of the first reference image and a POC of the second reference image.

The adaptively determining of the number of the candidate values may include determining the number of the candidate values included in the weight candidate group, based on at least one of a result of comparison between the POC of the first reference image and a POC of a current image including the current block and a result of comparison between the POC of the second reference image and the POC of the current image.

The number of the candidate values included in the weight candidate group when the POC of the first reference image and the POC of the second reference image are smaller than or equal to the POC of the current image may be different from the number of the candidate values included in the weight candidate group when the POC of the first reference image and the POC of the second reference image are greater than the POC of the current image.

The number of binary values corresponding to the weight index may vary according to a value of the weight index.

The image decoding method may further include assigning indexes to candidate values to be used for bi-directional prediction of the current block, wherein the combining of the first reference block with the second reference block includes combining the first reference block with the second reference block, according to a candidate value to which an index corresponding to the weight index is assigned.

The assigning of the indexes may include assigning indexes to the candidate values to be used for bi-directional prediction of the current block, according to accumulative numbers of times which the candidate values have been respectively selected for bi-directional prediction of previous blocks.

The indexes may be assigned to the candidate values for each image, each frame, or each tile.

The assigning of the indexes may include: selecting a previous image having a same temporal layer as a temporal layer of the current image in a current Group of Picture (GOP); and assigning the indexes to the candidate values to be used for bi-directional prediction of the current block, according to the accumulative numbers of times which the candidate values have been respectively selected for bi-directional prediction of previous blocks included in the selected previous image.

The assigning of the indexes may include assigning the indexes to the candidate values to be used for bi-directional prediction of the current block, according to the accumulative numbers of times which the candidate values have been respectively selected for previous blocks bi-directionally predicted by using the first reference image and the second reference image.

The combining of the first reference block with the second reference block may include: determining a pair value of the candidate value indicated by the weight index; and applying one of the candidate value and the pair value to the first reference block and applying the remaining one to the second reference block to thereby combine the first reference block with the second reference block.

The pair value may be not included in the weight candidate group, and the combining of the first reference block with the second reference block may include selecting a value that is to be applied to the first reference block and the second reference block from among the candidate value and the pair value, based on a POC of the first reference image and a POC of the second reference image.

According to an embodiment, an image decoding apparatus using bi-directional prediction includes: an obtainer configured to obtain a bitstream including weight information for bi-directional prediction of a current block; an entropy decoder configured to obtain a weight index by entropy decoding the weight information; and a prediction decoder configured to obtain a first reference block in a first reference image and a second reference block in a second reference image for bi-directional prediction of the current block, combine the first reference block with the second reference block according to a candidate value indicated by the weight index among candidate values included in a weight candidate group, and reconstruct the current block based on a result of the combining, wherein a first binary value corresponding to the weight index is entropy-decoded based on a context model, and the remaining binary value corresponding to the weight index is entropy-decoded by a bypass method.

According to an embodiment, an image encoding method using bi-directional prediction includes: obtaining a first reference block in a first reference image and a second reference block in a second reference image for bi-directional prediction of a current block; selecting a candidate value for combining the first reference block with the second reference block from among candidate values included in a weight candidate group; performing entropy encoding on a weight index indicating the selected candidate value; and generating a bitstream including weight information obtained as a result of the entropy encoding, and residual data, wherein a first binary value corresponding to the weight index is entropy-encoded based on a context model, and the remaining binary value corresponding to the weight index is entropy-encoded by a bypass method.

MODE OF DISCLOSURE

As the disclosure allows for various changes and numerous embodiments, specific embodiments will be illustrated in the drawings and described in detail in the written description. However, this is not intended to limit embodiments to particular modes of practice, and it is to be appreciated that the disclosure includes all changes, equivalents, and substitutes that do not depart from the spirit and technical scope of embodiments.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one component from another.

Also, in the present specification, it will be understood that when components are "connected" or "coupled" to each other, the components may be directly connected or coupled to each other, but may alternatively be connected or coupled to each other with an intervening component therebetween, unless specified otherwise.

In the present specification, regarding a component represented as a "portion (unit)" or a "module", two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

Also, in the present specification, an 'image' or a 'picture' may denote a still image. Also, the 'image' or 'picture' may denote a frame constituting a video, or a video itself.

Also, in the present specification, a 'sample' or 'signal' means, as data assigned to a sampling location of an image, data to be processed. For example, pixel values on a spatial-domain image and transform coefficients on a transform domain may be samples. A unit including such at least one sample may be defined as a block.

Hereinafter, an image encoding method and apparatus and an image decoding method and apparatus, based on a coding unit and a transform unit of a tree structure according to an embodiment will be disclosed with reference to FIGS. 1 to 20.

FIG. 1 is a block diagram of an image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory storing instructions that are executed by the at least one processor.

The bitstream obtainer 110 may receive a bitstream. The bitstream may include information resulting from image encoding by an image encoding apparatus 200 which will be described later. Also, the bitstream may be transmitted from the image encoding apparatus 200. The image decoding apparatus 100 may be connected to the image encoding apparatus 200 in a wired or wireless manner, and the bitstream obtainer 110 may receive a bitstream in a wired or wireless manner. The bitstream obtainer 110 may receive a bitstream from a storage medium, such as optical media, a hard disk, etc. The decoder 120 may reconstruct an image based on information obtained from the received bitstream. The decoder 120 may obtain a syntax element for reconstructing an image from the bitstream. The decoder 120 may reconstruct the image based on the syntax element.

The operation of the image decoding apparatus 100 will be described in detail below. The bitstream obtainer 110 may receive a bitstream.

The image decoding apparatus 100 may perform an operation of obtaining a bin string corresponding to a split shape mode of a coding unit from the bitstream. Then, the image decoding apparatus 100 may perform an operation of determining a split rule of a coding unit. Also, the image decoding apparatus 100 may perform an operation of splitting a coding unit into a plurality of coding units, based on at least one of the bin string corresponding to the split shape mode and the split rule. The image decoding apparatus 100 may determine a first range which is an allowable size range of a coding unit, according to a ratio of a height to a width of the coding unit, in order to determine the split rule. The image decoding apparatus 100 may determine a second range which is an allowable size range of a coding unit, according to a split shape mode of the coding unit, in order to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-slice may be 32×32, and the maximum size of the luma coding block that is ternary splittable in a P-slice or a B-slice may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be equal to or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
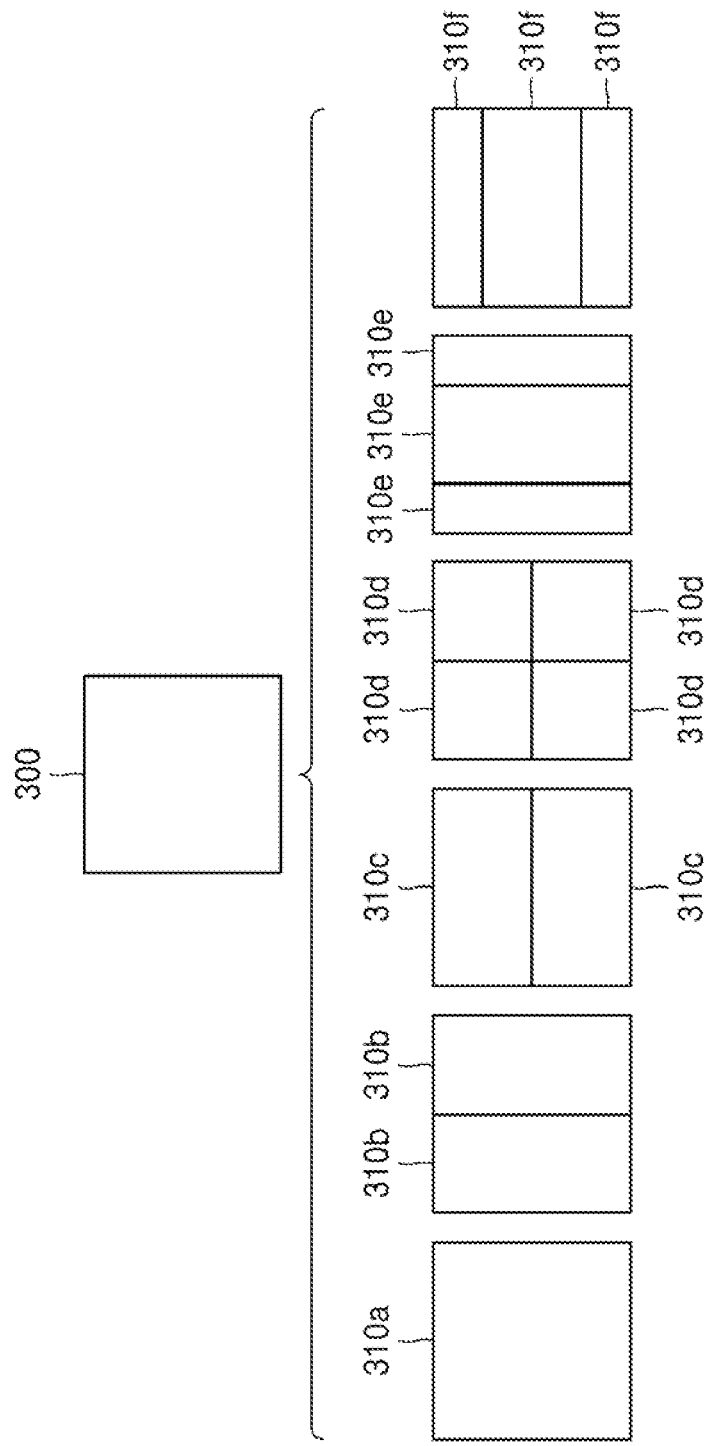
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a preset splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Preset splitting methods of splitting the square coding unit will be described in detail below in relation to various embodiments.

Figure 4:
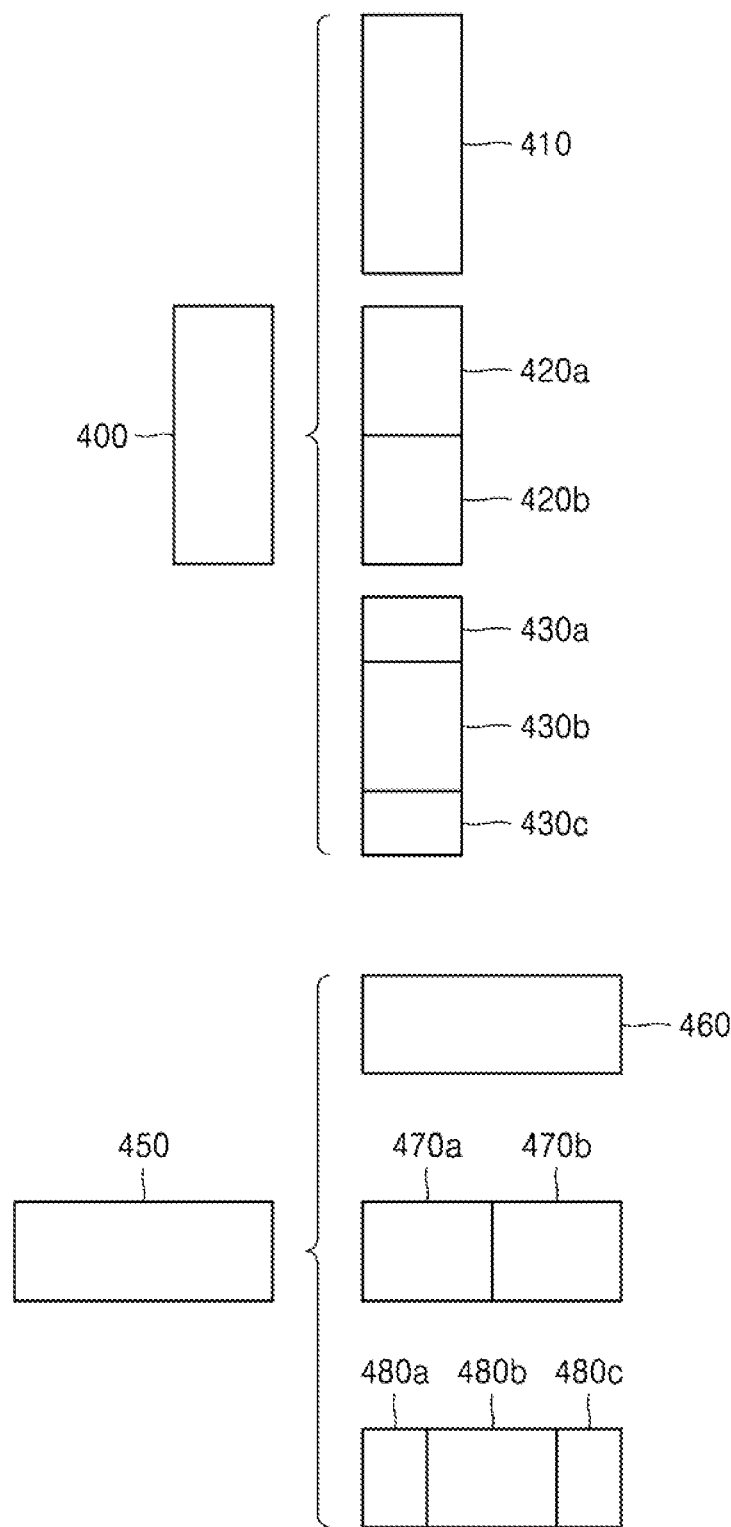
FIG. 4 illustrates a process, performed by an image decoding apparatus, of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a preset splitting method. Preset splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a preset coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c*, or 480*a*, 480*b*, and 480*c* generated as the current coding unit 400 or 450 is split to be different from that of the other coding units 430*a* and 430*c*, or 480*a* and 480*c*. For example, the image decoding apparatus 100 may restrict the coding unit 430*b* or 480*b* at the center location to be no longer split or to be split only a preset number of times, unlike the other coding units 430*a* and 430*c*, or 480*a* and 480*c*.

Figure 5:
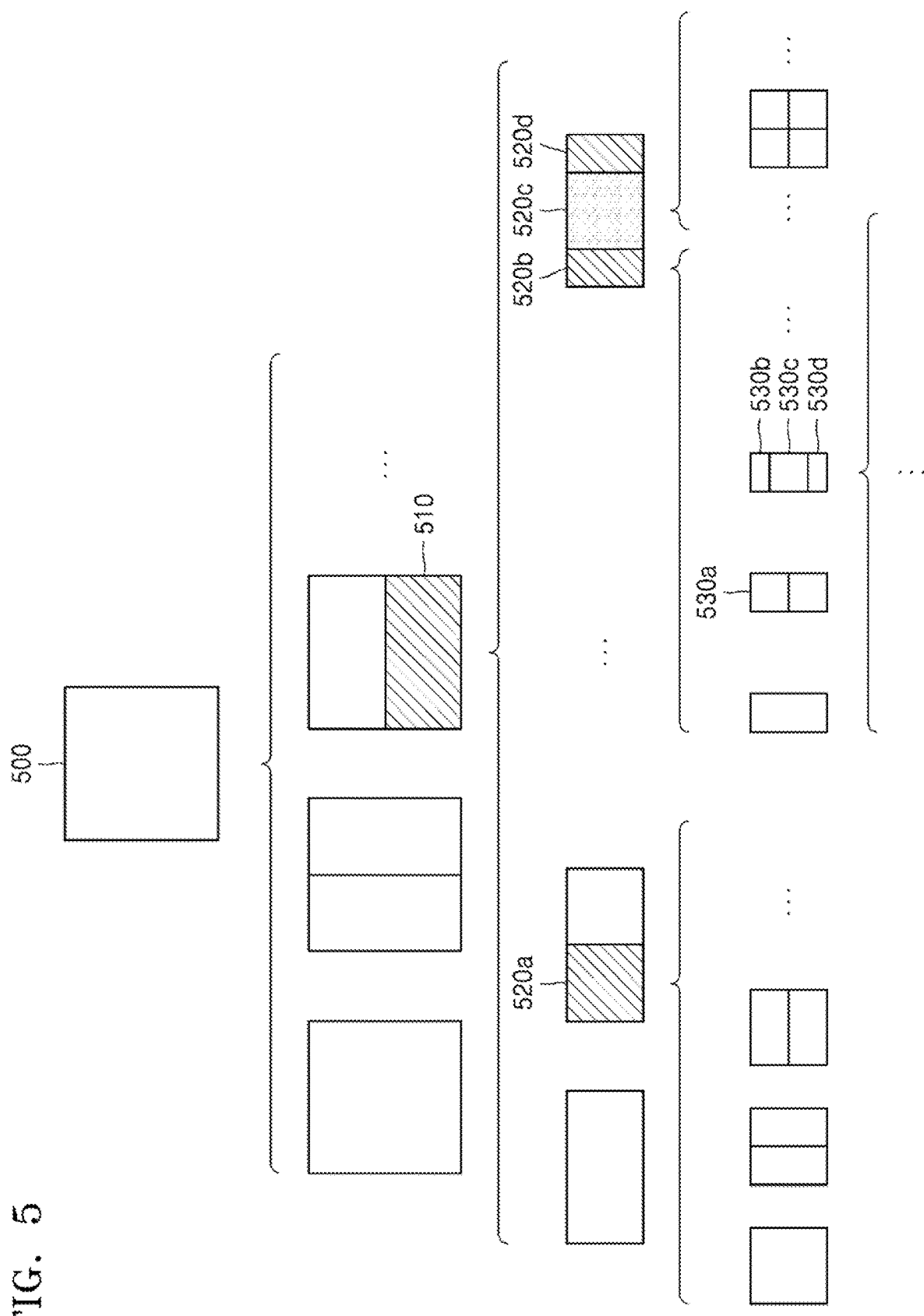
FIG. 5 illustrates a process, performed by an image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or to not split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or to not split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520*a*, 520*b*, 520*c*, and 520*d* based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520*a*, or 520*b*, 520*c*, and 520*d*) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520*b*, 520*c*, and 520*d* determined by splitting the non-square second coding unit 510 may be recursively split. According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among the plurality of fourth coding units 530*a*, 530*b*, 530*c*, and 530*d* may be re-split into a plurality of coding units. For example, the non-square fourth coding unit 530*b* or 530*d* may be re-split into an odd number of coding units. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine to not split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a preset restriction on a preset third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a preset location in the current coding unit.

Figure 6:
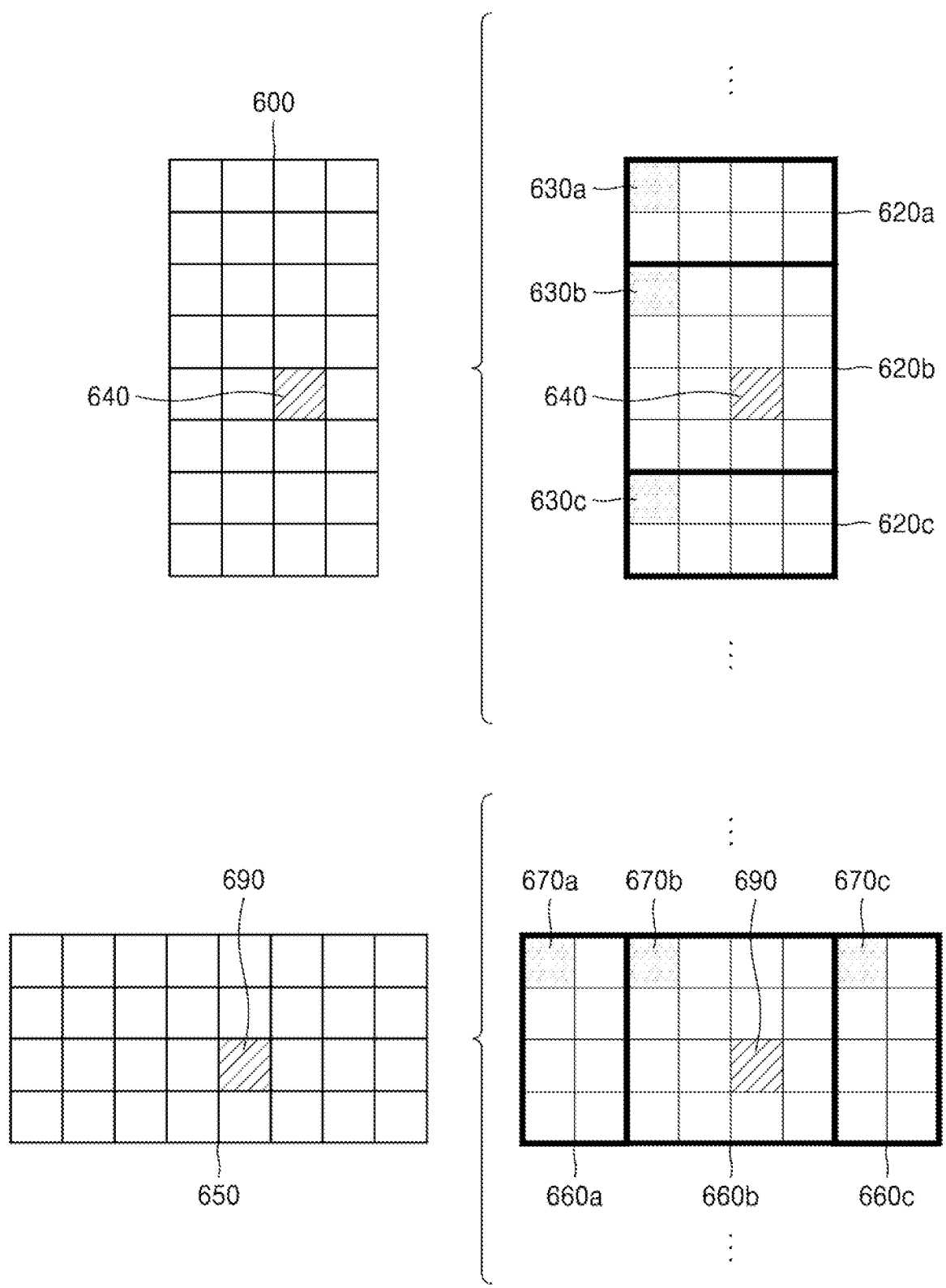
FIG. 6 illustrates a method, performed by an image decoding apparatus, of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the preset location and may determine to split or to not split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620a, 620b, and 620c based on information indicating locations of upper-left samples 630a, 630b, and 630c of the coding units 620a, 620b, and 620c.

According to an embodiment, the information indicating the locations of the upper-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper-left sample 630a of the upper coding unit 620a may include coordinates (xa, ya), information indicating the location of the upper-left sample 630b of the center coding unit 620b may include coordinates (xb, yb), and information indicating the location of the upper-left sample 630c of the lower coding unit 620c may include coordinates (xc, yc). The image decoding apparatus 100 may determine the middle coding unit 620b by using the coordinates of the upper-left samples 630a, 630b, and 630c which are included in the coding units 620a, 620b, and 620c, respectively. For example, when the coordinates of the upper-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper-left samples 630a, 630b, and 630c may include coordinates indicating absolute locations in the picture, or may use coordinates (dxb, dyb) indicating a relative location of the upper-left sample 630b of the middle coding unit 620b and coordinates (dxc, dyc) indicating a relative location of the upper-left sample 630c of the lower coding unit 620c with reference to the location of the upper-left sample 630a of the upper coding unit 620a. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper-left sample 630a of the upper coding unit 620a, the coordinates (xb, yb) that is the information indicating the location of the upper-left sample 630b of the middle coding unit 620b, and the coordinates (xc, yc) that are the information indicating the location of the upper-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660a, 660b, and 660c by using the coordinates (xd, yd) that are information indicating the location of an upper-left sample 670a of the left coding unit 660a, the coordinates (xe, ye) that are information indicating the location of an upper-left sample 670b of the middle coding unit 660b, and the coordinates (xf, yf) that are information indicating a location of the upper-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe−xd. The image decoding apparatus 100 may determine the height of the left coding unit 660a to be the height of the current coding unit 650. According to an embodiment, the image decoding apparatus 100 may determine the width of the middle coding unit 660b to be xf−xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the sizes of the left and right coding units 660a and 660c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a preset location from among an odd number of coding units determined by splitting the current coding unit, considering the shape of the current coding unit. For example, when the current coding unit has a non-square shape, a width of which is longer than a height, the image decoding apparatus 100 may determine the coding unit at the preset location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of the coding units 620a, 620b, and 620c determined by splitting the current coding unit 600 (e.g., a coding unit at a center location from among a plurality of split coding units). That is, the image decoding apparatus 100 may determine the sample at the preset location by considering a block shape of the current coding unit 600, may determine the coding unit 620b including a sample, from which preset information (e.g., the split shape mode information) can be obtained, from among the plurality of coding units 620a, 620b, and 620c determined by splitting the current coding unit 600, and may put a preset restriction on the coding unit 620b. Referring to FIG. 6, according to an embodiment, the image decoding apparatus 100 may determine the sample 640 at the center location of the current coding unit 600 as the sample from which the preset information may be obtained, and may put a preset restriction on the coding unit 620b including the sample 640, in a decoding operation. However, the location of the sample from which the preset information can be obtained is not limited to the above-described location, and may include arbitrary locations of samples included in the coding unit 620b to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding apparatus 100 may determine a sample located on a boundary for splitting at least one of a width and height of the current coding unit in half, as the sample from which the preset information can be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the preset information can be obtained.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and may split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a preset block (e.g., the current coding unit).

Figure 7:
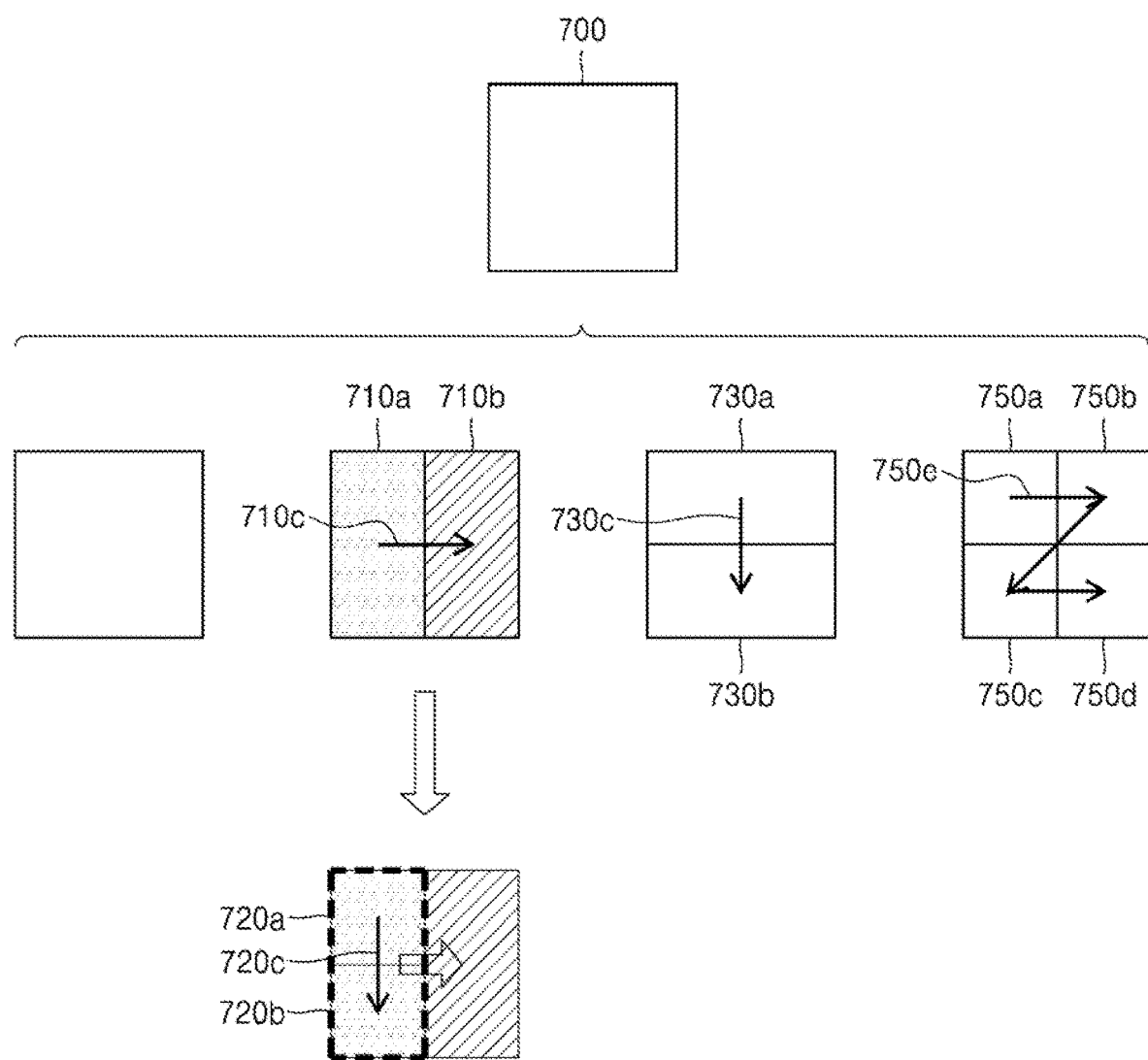
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a, 750b, 750c, and 750d, which are determined by splitting the first coding unit 700 in vertical and horizontal directions, according to a preset order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or to not split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a preset order.

Figure 8:
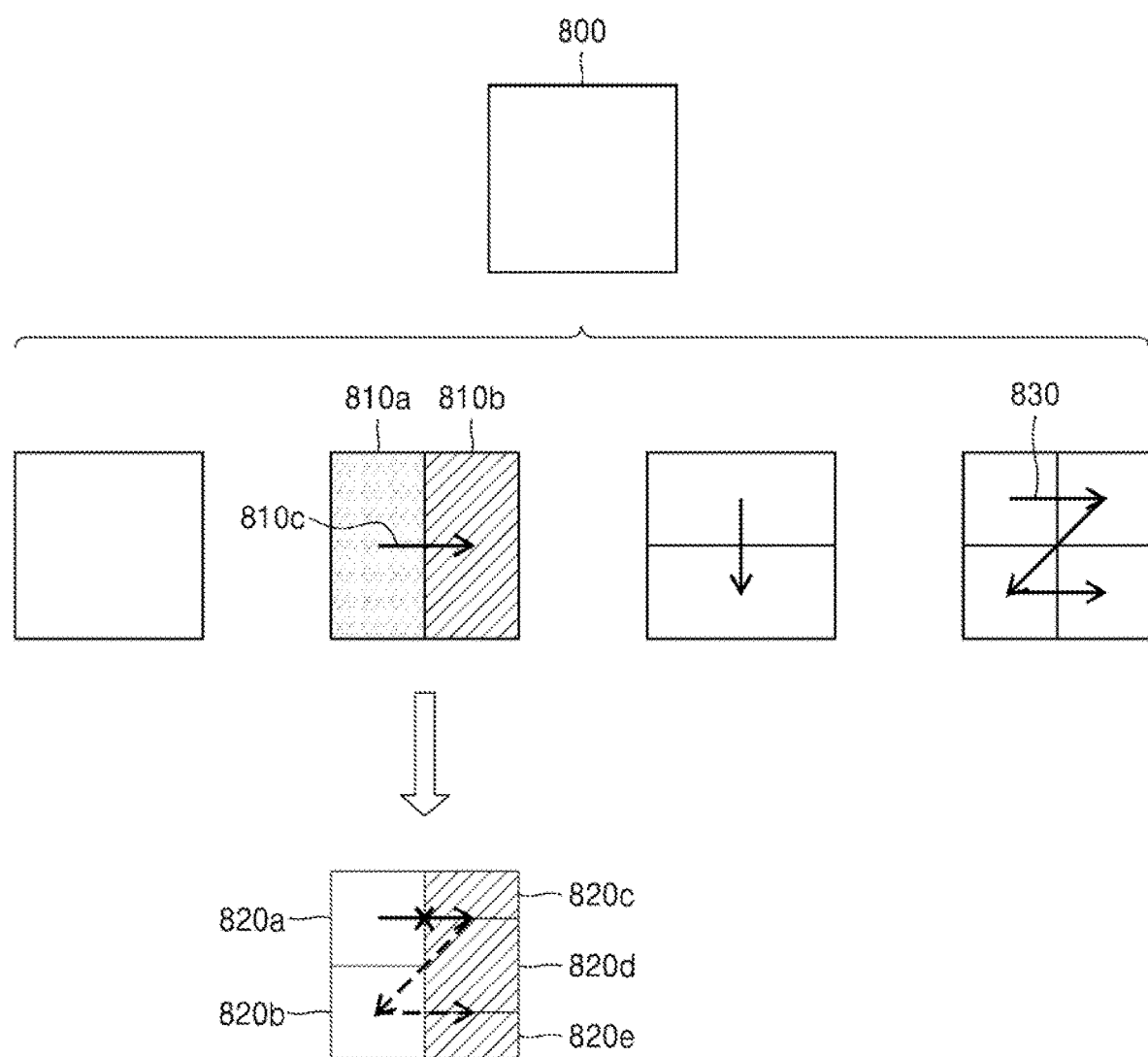
FIG. 8 illustrates a process, performed by an image decoding apparatus, of determining that a current coding unit is to be split into an odd number of coding units, when the coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c*, 820*d*, and 820*e*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c*, 820*d*, and 820*e*.

According to an embodiment, the video decoding apparatus 100 may determine whether any coding unit is split into an odd number of coding units, by determining whether the third coding units 820*a* and 820*b*, and 820*c*, 820*d*, and 820*e* are processable in a preset order. Referring to FIG. 8, the image decoding apparatus 100 may determine the third coding units 820*a* and 820*b*, and 820*c*, 820*d*, and 820*e* by recursively splitting the first coding unit 800. The image decoding apparatus 100 may determine whether any of the first coding unit 800, the second coding units 810*a* and 810*b*, or the third coding units 820*a* and 820*b*, and 820*c*, 820*d*, and 820*e* are split into an odd number of coding units, based on at least one of the block shape information and the split shape mode information. For example, a coding unit located in the right from among the second coding units 810*a* and 810*b* may be split into an odd number of third coding units 820*c*, 820*d*, and 820*e*. A processing order of a plurality of coding units included in the first coding unit 800 may be a preset order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the preset order.

According to an embodiment, the image decoding apparatus 100 may determine whether the third coding units 820*a* and 820*b*, and 820*c*, 820*d*, and 820*e* included in the first coding unit 800 satisfy the condition for processing in the preset order, and the condition relates to whether at least one of a width and height of the second coding units 810*a* and 810*b* is to be split in half along a boundary of the third coding units 820*a* and 820*b*, and 820*c*, 820*d*, and 820*e*. For example, the third coding units 820*a* and 820*b* determined when the height of the left second coding unit 810*a* of the non-square shape is split in half may satisfy the condition. It may be determined that the third coding units 820*c*, 820*d*, and 820*e* do not satisfy the condition because the boundaries of the third coding units 820*c*, 820*d*, and 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

Figure 9:
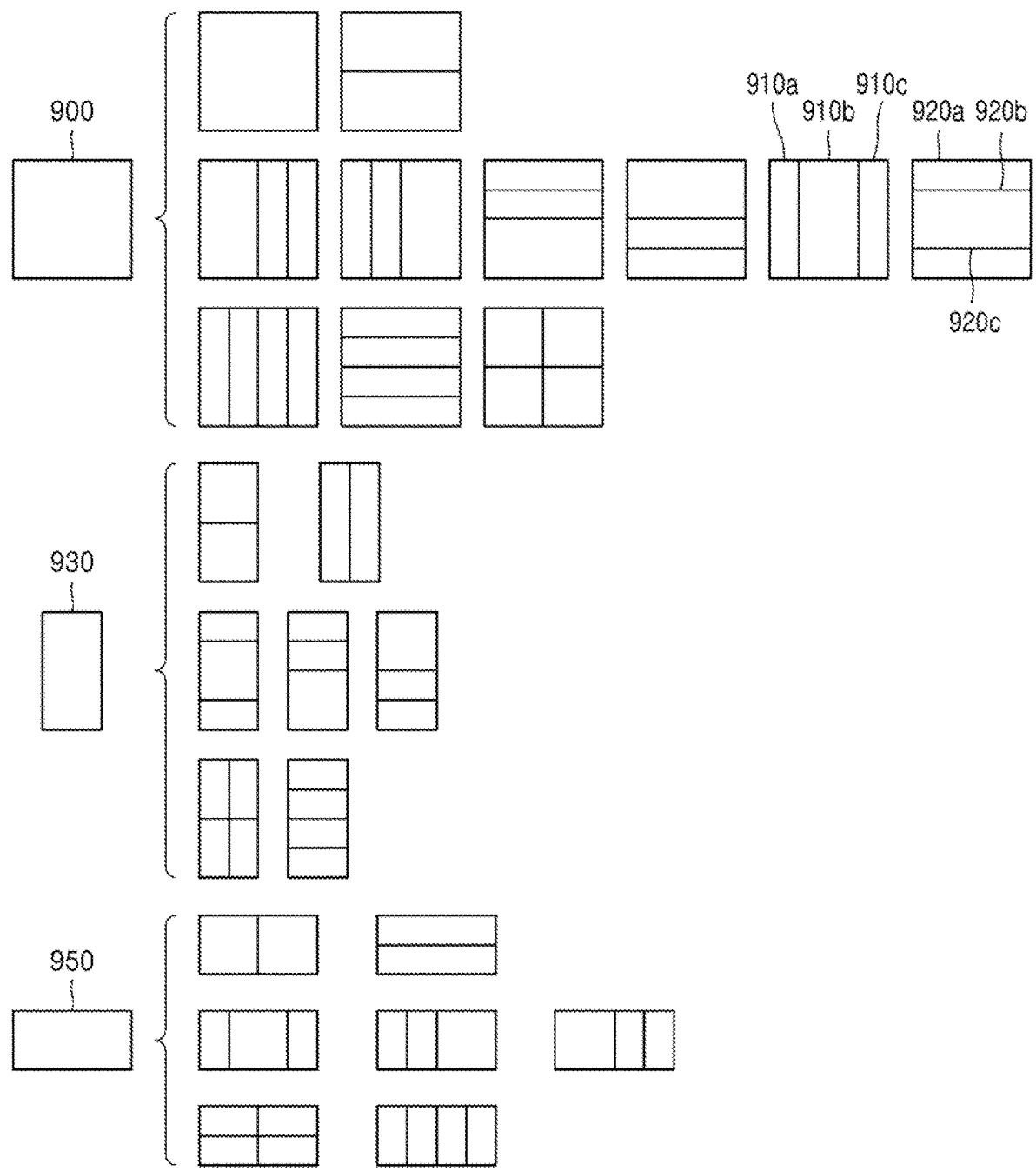
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained through the bitstream obtainer 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a preset order, and the condition relates to whether at least one of a width and height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the preset order. Also, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
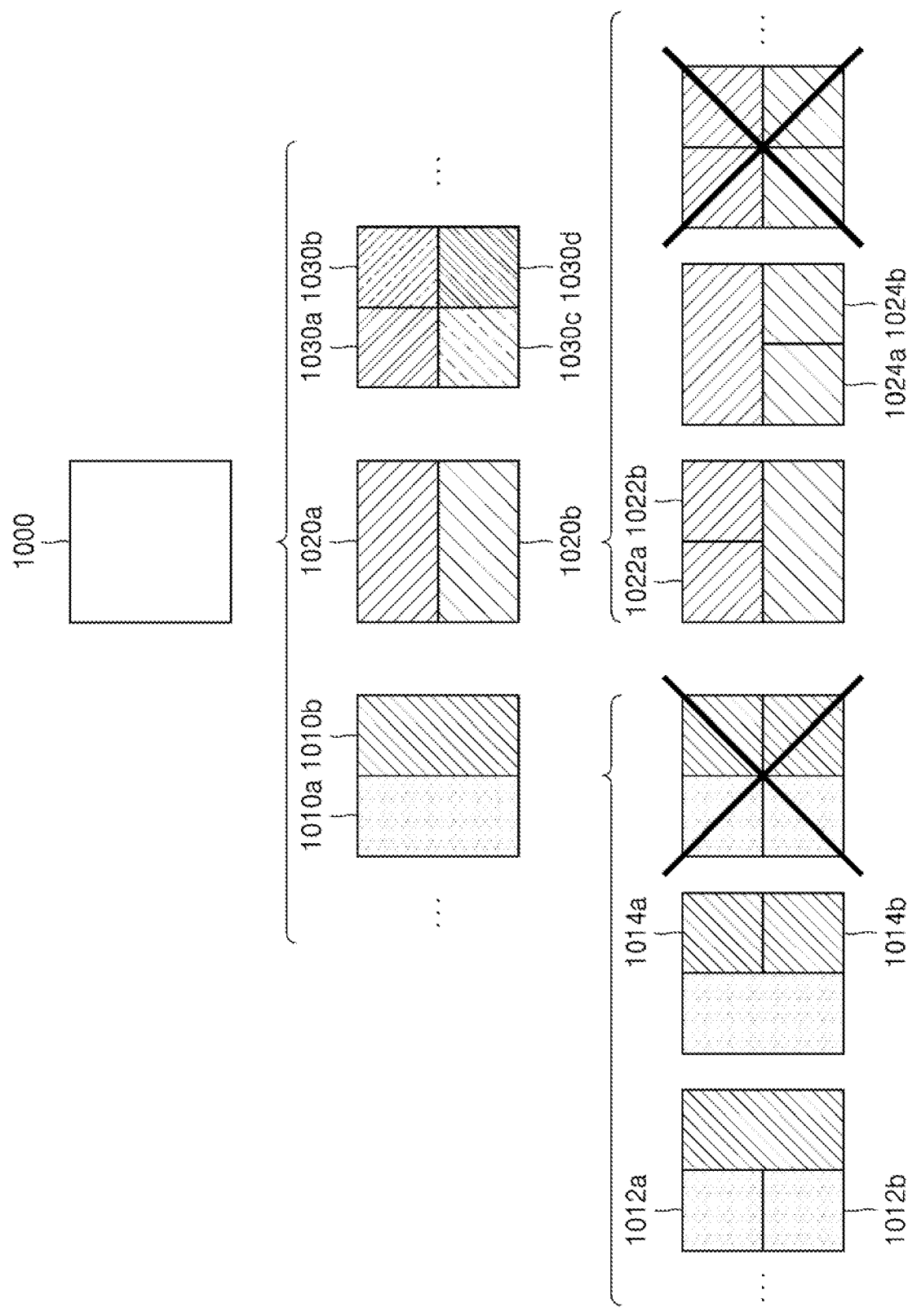
FIG. 10 illustrates that a shape into which a second coding unit is splittable is restricted when the second coding unit having a non-square shape, which is determined when an image decoding apparatus splits a first coding unit, satisfies a preset condition, according to an embodiment.

FIG. 10 illustrates that a shape into which a second coding unit is splittable is restricted when the second coding unit having a non-square shape, which is determined when the image decoding apparatus 100 splits a first coding unit 1000, satisfies a preset condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the bitstream obtainer 110. The second coding units 1010a and 1010b, or 1020a and 1020b may be independently split. As such, the image decoding apparatus 100 may determine to split or to not split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
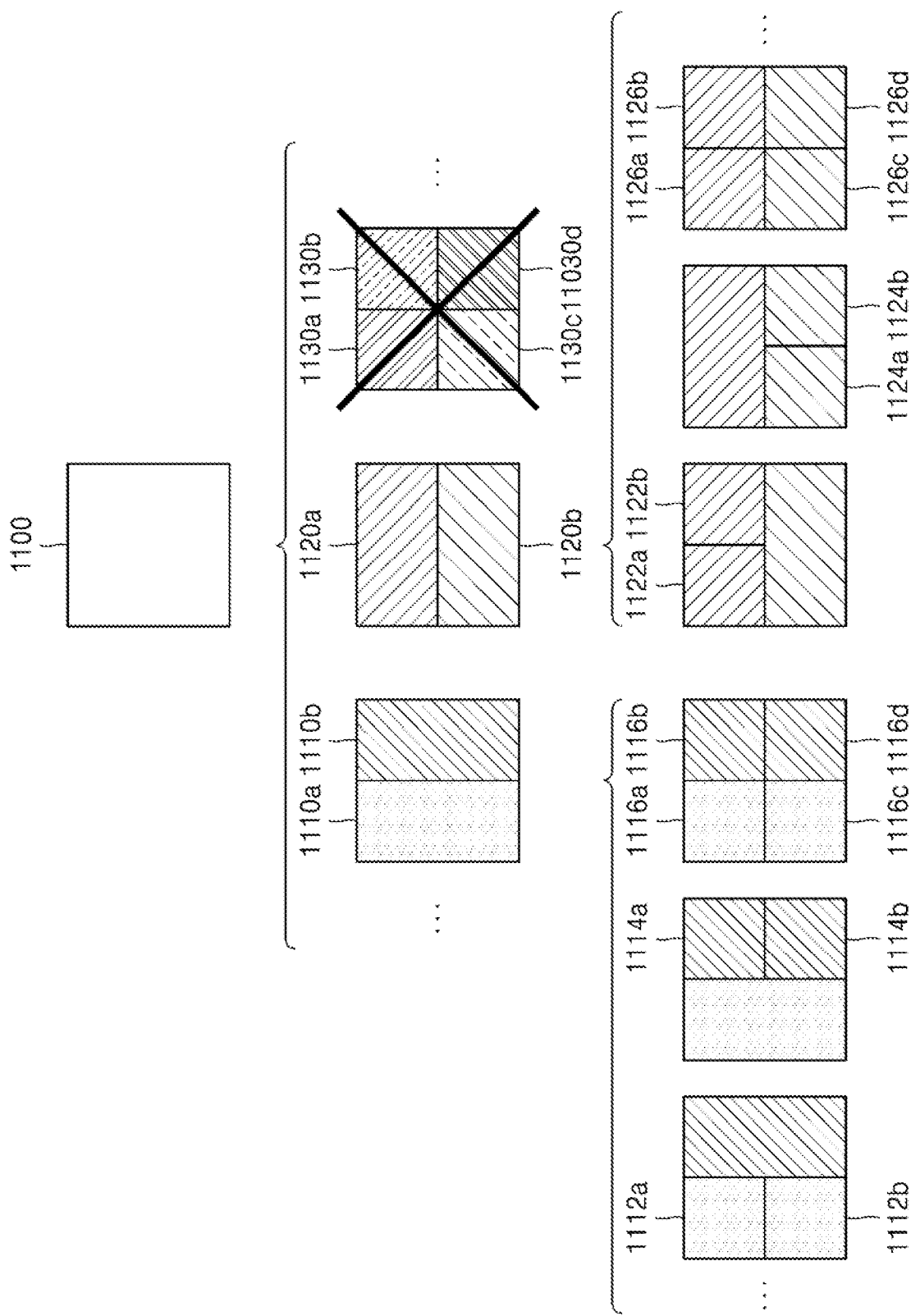
FIG. 11 illustrates a process, performed by an image decoding apparatus, of splitting a square coding unit when split shape mode information indicates that the square coding unit is to not be split into four square coding units, according to an embodiment.

FIG. 11 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
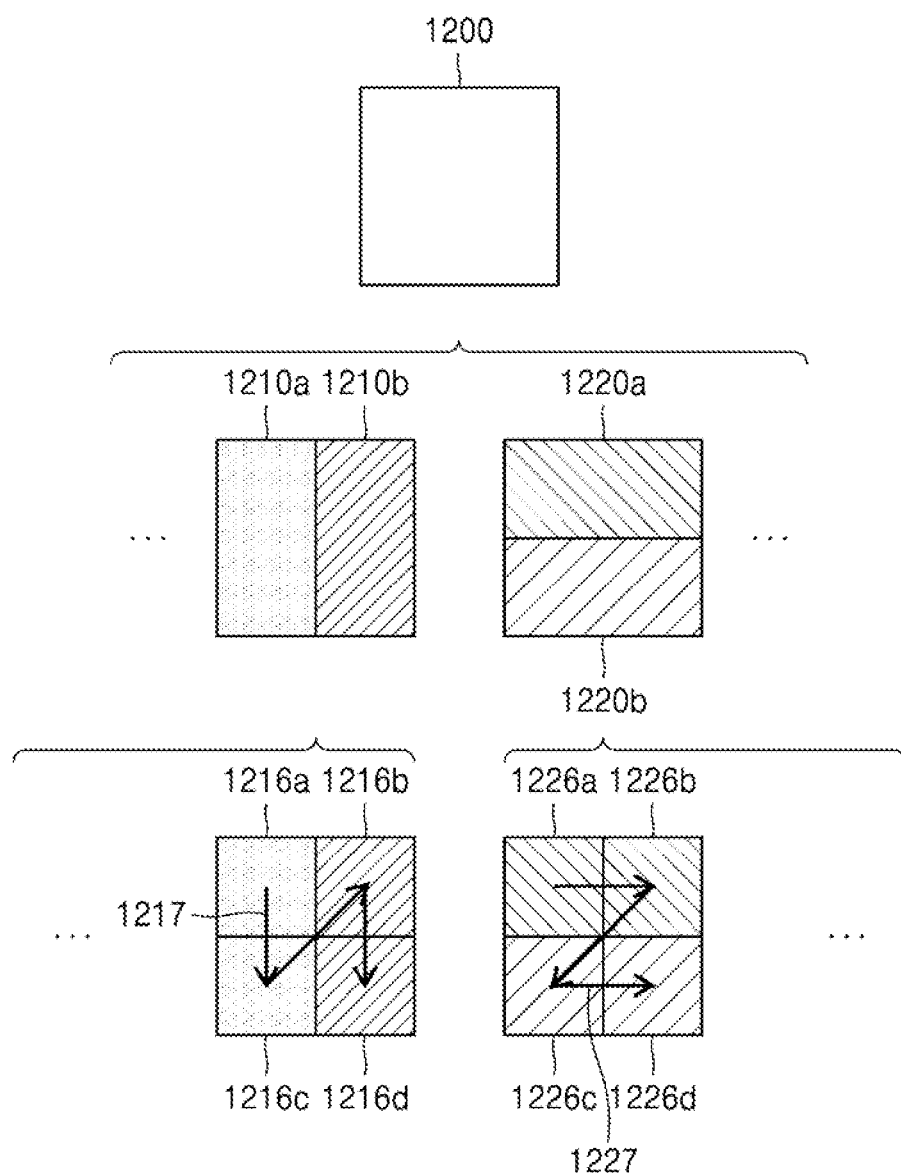
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and

1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding apparatus 100 may process coding units in a preset order. An operation of processing coding units in a preset order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
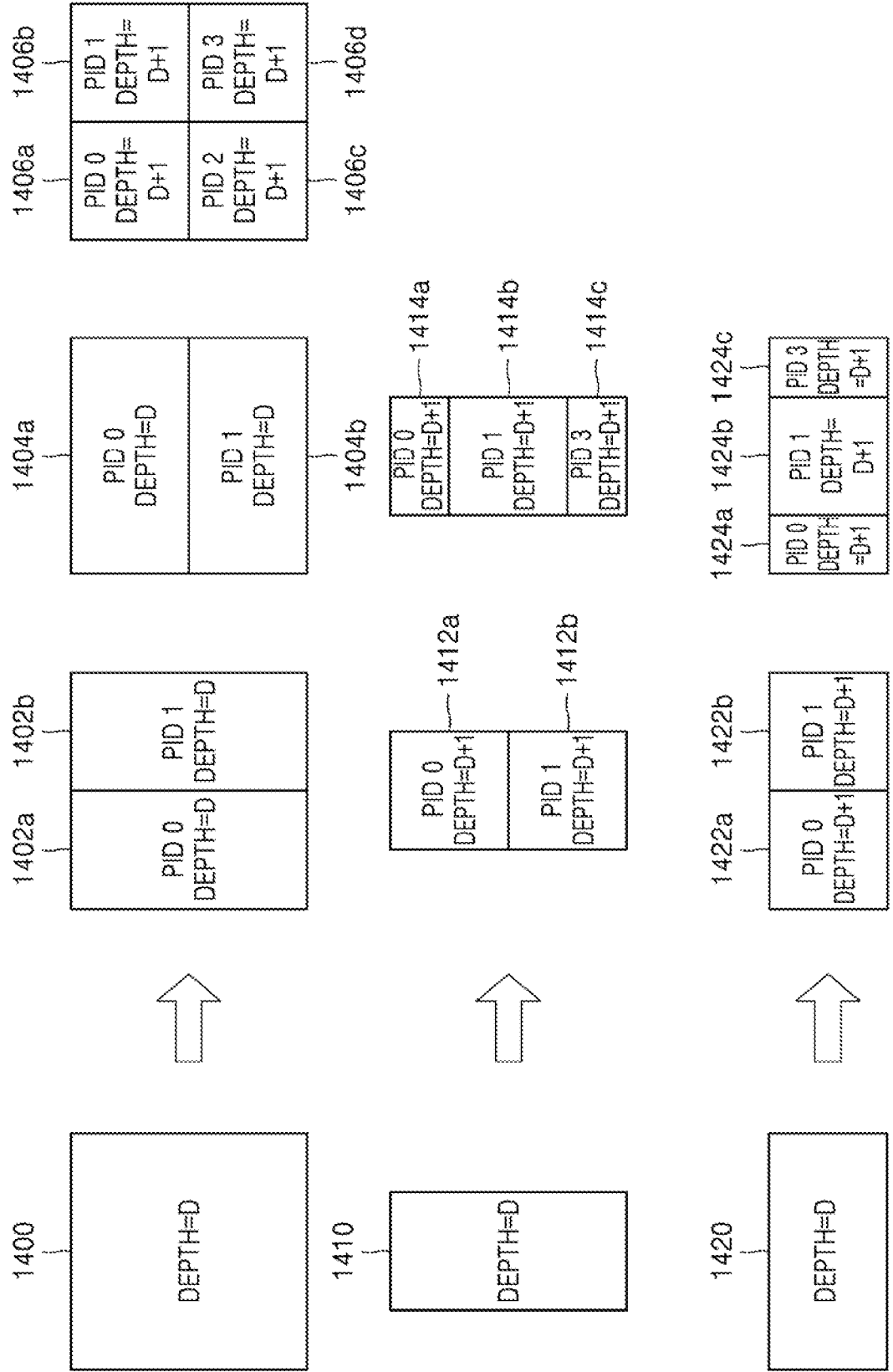
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a preset location of each coding unit (e.g., an upper-left sample).

According to an embodiment, the image decoding apparatus 100 may determine a coding unit at a preset location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 100 may use a preset data unit where a coding unit starts to be recursively split.

Figure 15:
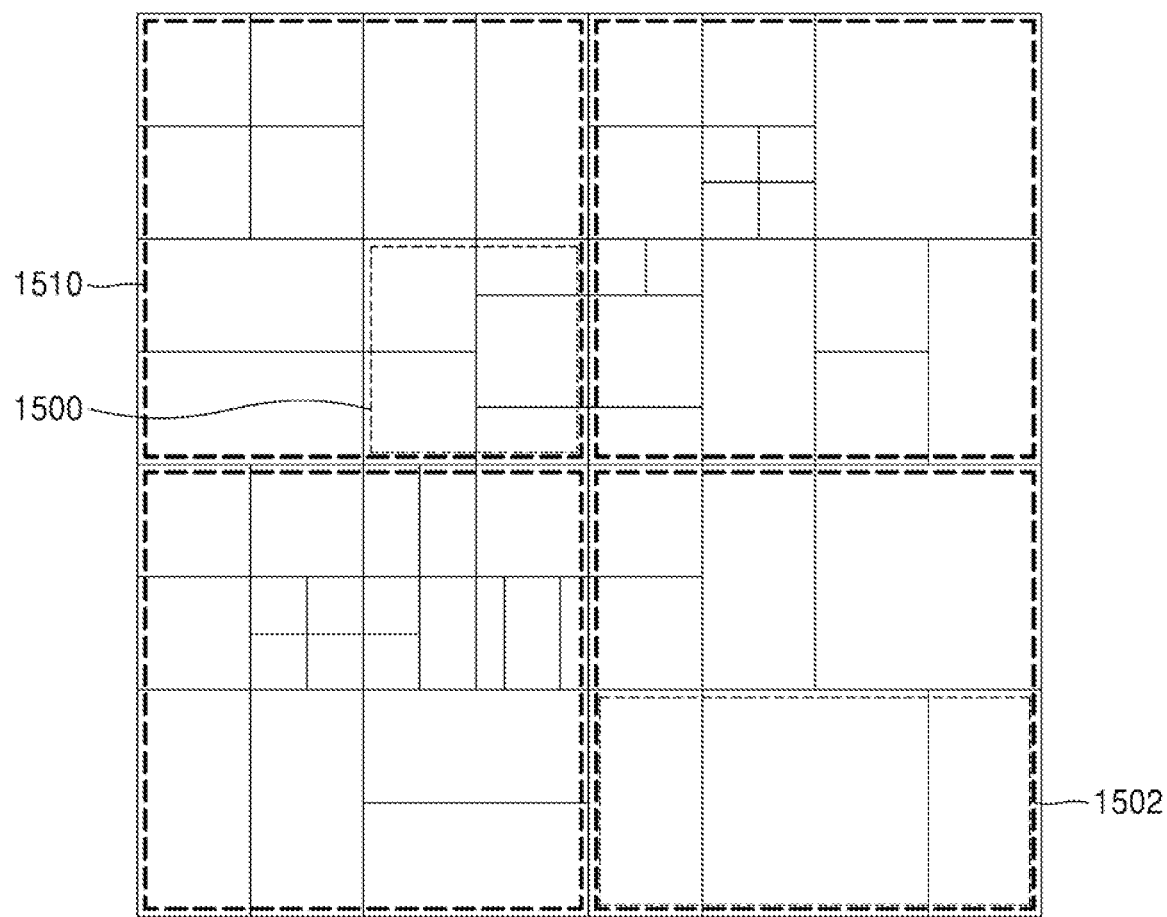
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may predetermine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the bitstream obtainer 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units predetermined based on a preset condition. That is, the bitstream obtainer 110 may obtain, from the bitstream, only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding apparatus 100 may determine at least one of the size and shape of reference coding units included in a data unit serving as a unit for obtaining the PID, by selecting the predetermined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
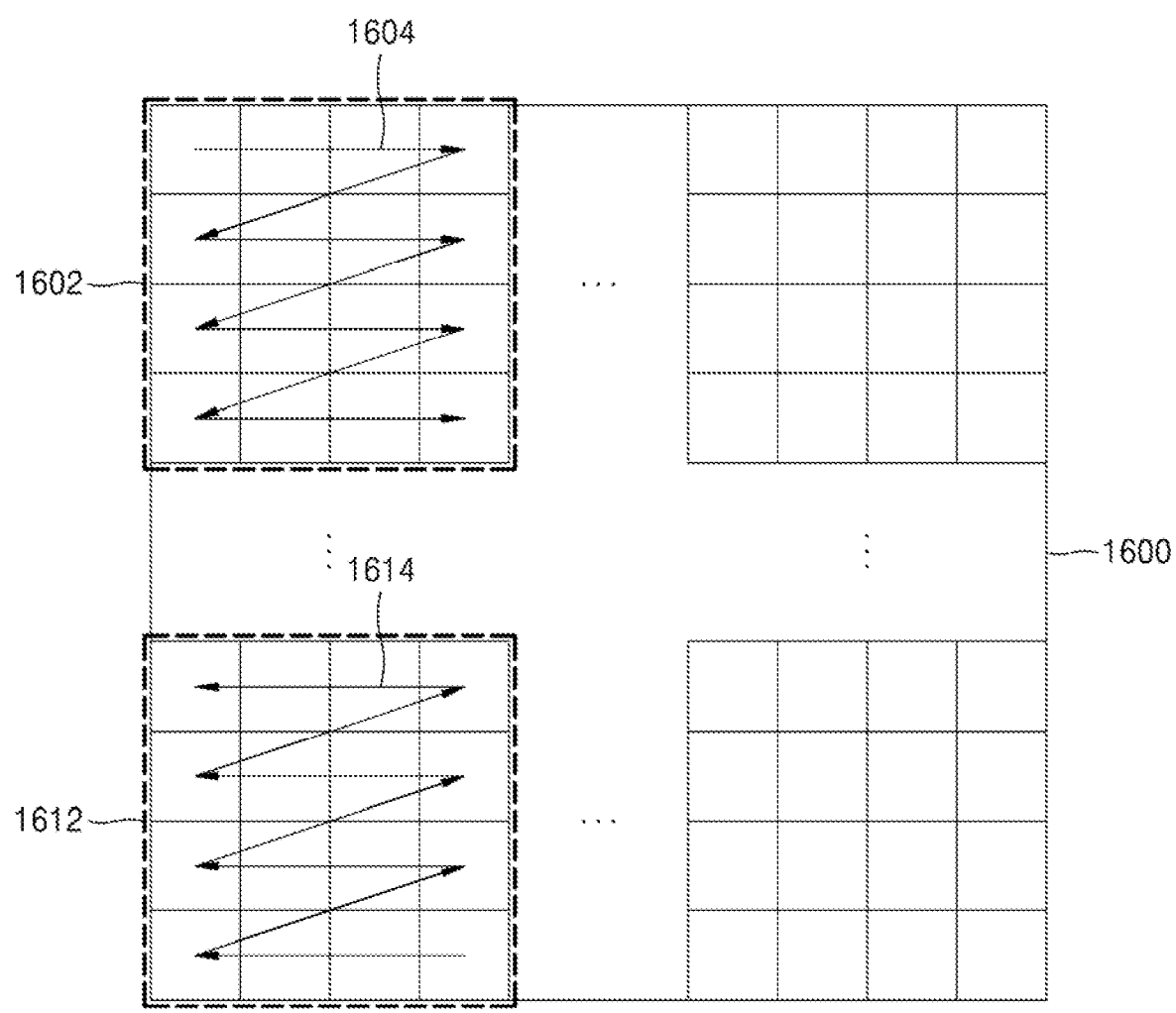
FIG. 16 illustrates a processing block used as a criterion for determining an order of determining reference coding units included in a picture, according to an embodiment.

FIG. 16 illustrates a processing block used as criterion for determining an order of determining reference coding units included in a picture 1600, according to an embodiment.

According to an embodiment, the image decoding apparatus 100 may determine one or more processing blocks splitting a picture. A processing block may be a data unit including one or more reference coding units splitting an image, and one or more reference coding units included in a processing block may be determined according to a specific order. That is, an order of determining one or more reference coding units for each processing block may correspond to one of various types of orders for determining reference coding units, and different processing blocks may have different orders of determining reference coding units. An order of determining reference coding units for each processing block may be one of various orders, e.g., raster scan, Z-scan, N-scan, up-right diagonal scan, horizontal scan, and vertical scan, but is not limited to the above-mentioned scan orders.

According to an embodiment, the image decoding apparatus 100 may obtain processing block size information to determine a size of at least one processing block included in an image. The image decoding apparatus 100 may obtain the processing block size information from a bitstream to determine the size of at least one processing block included in the image. The size of the processing block may be a preset size of a data unit, indicated by the processing block size information.

According to an embodiment, the bitstream obtainer 110 of the image decoding apparatus 100 may obtain processing block size information from a bitstream for each specific data unit. For example, the processing block size information may be obtained from the bitstream in a data unit, such as an image, a sequence, a picture, a slice, a slice segment, a tile, a tile group, etc. That is, the bitstream obtainer 110 may obtain processing block size information from a bitstream for each of the various data units, and the image decoding apparatus 100 may determine a size of at least one processing block splitting a picture by using the obtained processing block size information, wherein the size of the processing block may be an integer multiple of a reference coding unit.

According to an embodiment, the image decoding apparatus 100 may determine a size of processing blocks 1602 and 1612 included in the picture 1600. For example, the image decoding apparatus 100 may determine a size of a processing block based on processing block size information obtained from a bitstream. Referring to FIG. 16, according to an embodiment, the image decoding apparatus 100 may determine a horizontal size of the processing blocks 1602 and 1612 to be four times that of a reference coding unit, and may determine a vertical size of the processing blocks 1602 and 1612 to be four times that of the reference coding unit. The image decoding apparatus 100 may determine an order of determining one or more reference coding units in one or more processing blocks.

According to an embodiment, the image decoding apparatus 100 may determine the processing blocks 1602 and 1612 included in the picture 1600, based on the size of the processing block, and may determine an order of determining one or more reference coding units included in the processing blocks 1602 and 1612. According to an embodiment, determining a reference coding unit may include determining a size of the reference coding unit.

According to an embodiment, the image decoding apparatus 100 may obtain, from a bitstream, information about an order of determining one or more reference coding units included in one or more processing blocks, and may determine an order of determining one or more reference coding units based on the information about the determination order. The information about the determination order may be defined as an order or direction in which the reference coding units are determined in the processing block. That is, an order in which reference coding units are determined may be independently determined for each processing block.

According to an embodiment, the image decoding apparatus 100 may obtain, from a bitstream, information about an order of determining reference coding units for each specific data unit. For example, the bitstream obtainer 110 may obtain information about an order of determining reference coding units from a bitstream for each data unit, such as an image, a sequence, a picture, a slice, a slice segment, a tile, a tile group, a processing block, etc. Because information about an order of determining reference coding units indicates an order of determining reference coding units in a processing block, the information about the determination order may be obtained for each specific data unit including an integer number of processing blocks.

The image decoding apparatus 100 may determine one or more reference coding units based on an order determined according to an embodiment.

According to an embodiment, the bitstream obtainer 110 may obtain, from a bitstream, information about an order of determining reference coding units as information related to the processing blocks 1602 and 1612, and the image decoding apparatus 100 may determine an order of determining one or more reference coding units included in the processing blocks 1602 and 1612, and determine one or more reference coding units included in the picture 1600 according to the order of determining the reference coding units. Referring to FIG. 16, the image decoding apparatus 100 may determine orders 1604 and 1614 of determining one or more reference coding units with respect to the processing blocks 1602 and 1612, respectively. For example, when information about an order of determining reference coding units is obtained for each processing block, the processing blocks 1602 and 1612 may have different orders of determining reference coding units. When the order 1604 of determining reference coding units with respect to the processing block 1602 is an order of raster scan, the reference coding units included in the processing block 1602 may be determined in the order of raster scan. On the contrary, when the order 1614 of determining reference coding units with respect to the other processing block 1612 is a reverse order of raster scan, the reference coding units included in the processing block 1612 may be determined in the reverse order of raster scan.

According to an embodiment, the image decoding apparatus 100 may decode the one or more reference coding units. The image decoding apparatus 100 may decode an image based on the reference coding units determined through the above-described embodiment. A method of decoding reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 200 and the image decoding apparatus 100 may predetermine to determine the split rule based on the block shape of the coding unit. However, the embodiment is not limited thereto. The image decoding apparatus 100 may determine the split rule based on the information obtained from the bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders is described above with reference to FIG. 12, details thereof are not provided again.

Figure 17:
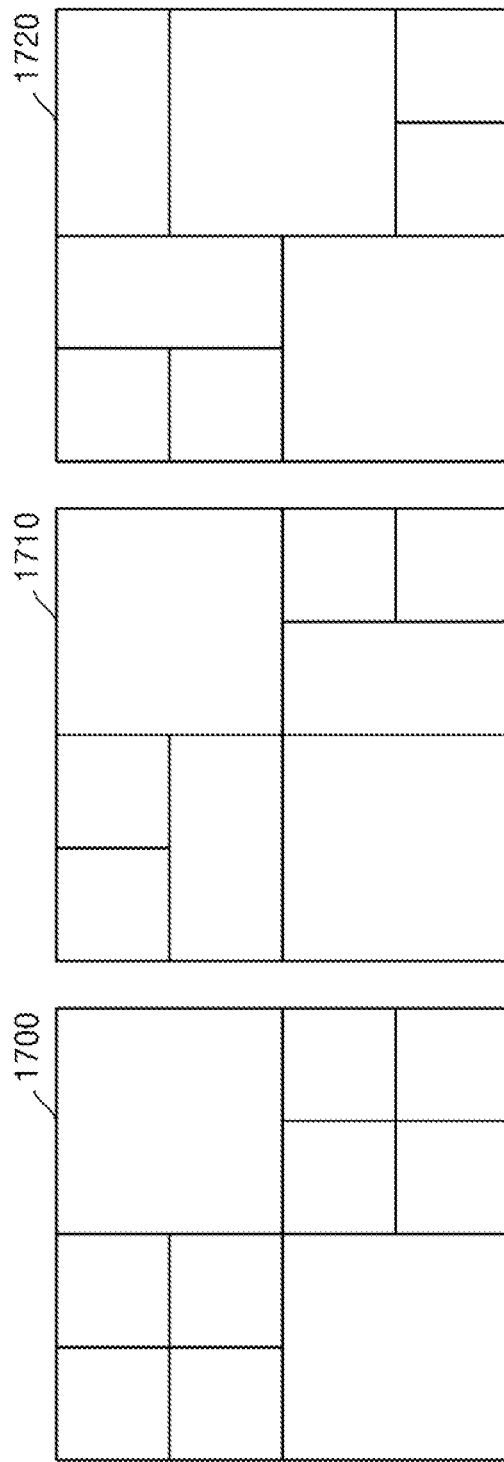
FIG. 17 illustrates coding units of individual pictures, when the individual pictures have different split shape combinations of coding units, according to an embodiment.

FIG. 17 illustrates coding units of individual pictures, when the individual pictures have different split shape combinations of coding units, according to an embodiment.

Referring to FIG. 17, the image decoding apparatus 100 may determine different split shape combinations of coding units for individual pictures. For example, the image decoding apparatus 100 may decode an image by using a picture 1700 that can be split into four coding units, a picture 1710 that can be split into two or four coding units, and a picture 1720 that can be split into two, three, or four coding units, among at least one picture included in the image. The image decoding apparatus 100 may use only split shape information indicating splitting into four square coding units, in order to split the picture 1700 into a plurality of coding units. The image decoding apparatus 100 may use only split shape information indicating splitting into two or four coding units, in order to split the picture 1710. The image decoding apparatus 100 may use only split shape information indicating splitting into two, three, or four coding units, in order to split the picture 1720. The above-described split shape combinations are embodiments for describing operations of the image decoding apparatus 100, and therefore, the above-described split shape combinations should not be interpreted to be limited to the above-described embodiments. It should be interpreted that various split shape combinations can be used for each preset data unit.

According to an embodiment, the bitstream obtainer 110 of the image decoding apparatus 100 may obtain a bitstream including an index representing a combination of split shape information for each preset data unit (for example, a sequence, a picture, a slice, a slice segment, a tile, a tile group, etc.). For example, the bitstream obtainer 110 may obtain an index representing a combination of split shape information from a sequence parameter set, a picture parameter set, a slice header, a tile header, or a tile group header. The bitstream obtainer 110 of the image decoding apparatus 100 may use the obtained index to determine a split shape combination into which coding units can be split for each preset data unit, and accordingly, the bitstream obtainer 110 may use different split shape combinations for individual preset data units.

Figure 18:
FIG. 18 illustrates various shapes of coding units that can be determined based on split shape mode information that may be expressed with a binary code, according to an embodiment.

FIG. 18 illustrates various shapes of coding units that can be determined based on split shape mode information that can be expressed with a binary code, according to an embodiment.

According to an embodiment, the image decoding apparatus 100 may split coding units into various shapes by using block shape information and split shape mode information obtained through the bitstream obtainer 110. Shapes into which coding units can be split may be various shapes including shapes described above through the embodiments.

Referring to FIG. 18, the image decoding apparatus 100 may split a coding unit having a square shape in at least one direction of a horizontal direction and a vertical direction, and a coding unit having a non-square shape in the horizontal direction or the vertical direction, based on split shape mode information.

According to an embodiment, when the image decoding apparatus 100 can split a coding unit having a square shape in the horizontal direction and the vertical direction to determine four square coding units, split shape mode information for a square coding unit may represent four split shapes. According to an embodiment, the split shape mode information may be expressed with a binary code of 2 digits, and each split shape may be assigned a binary code. For example, when a coding unit is not split, split shape mode information may be expressed as (00)b, when a coding unit is split in the horizontal direction and the vertical direction, split shape mode information may be expressed as (01)b, when a coding unit is split in the horizontal direction, split shape mode information may be expressed as (10)b, and when a coding unit is split in the vertical direction, split shape mode information may be expressed as (11)b.

According to an embodiment, when the image decoding apparatus 100 splits a coding unit having a non-square shape in the horizontal direction or the vertical direction, kinds of split shapes that can be represented by split shape mode information may depend on the number of coding units into which the coding unit is to be split. Referring to FIG. 18, the image decoding apparatus 100 may split a coding unit having a non-square shape up to three, according to an embodiment. Also, the image decoding apparatus 100 may split a coding unit into two coding units. In this case, split shape mode information may be expressed as (10)b. The image decoding apparatus 100 may split a coding unit into three coding units. In this case, split shape mode information may be expressed as (11)b. The image decoding apparatus 100 may determine not to split a coding unit. In this case, split shape mode information may be expressed as (0)b. That is, the image decoding apparatus 100 may use Variable Length Coding (VLC), instead of Fixed Length Coding (FLC), in order to use a binary code representing split shape mode information.

According to an embodiment, referring to FIG. 18, a binary code of split shape mode information representing that a coding unit is not split may be expressed as (0)b. In the case in which a binary code of split shape mode information representing that a coding unit is not split is set to (00)b, a binary code of split shape mode information of 2 bits may need to be all used although there is no split shape mode information set to (01)b. However, in the case in which three split shapes are used for a coding unit having a non-square shape, as shown in FIG. 18, the image decoding apparatus 100 can determine that a coding unit is not split by using a binary code (0)b of 1 bit as split shape mode information, thereby efficiently using a bitstream. However, split shapes of a coding unit having a non-square shape, which are represented by split shape mode information, should be not interpreted to be limited to three shapes shown in FIG. 18, and should be interpreted to be various shapes including the above-described embodiments.

Figure 19:
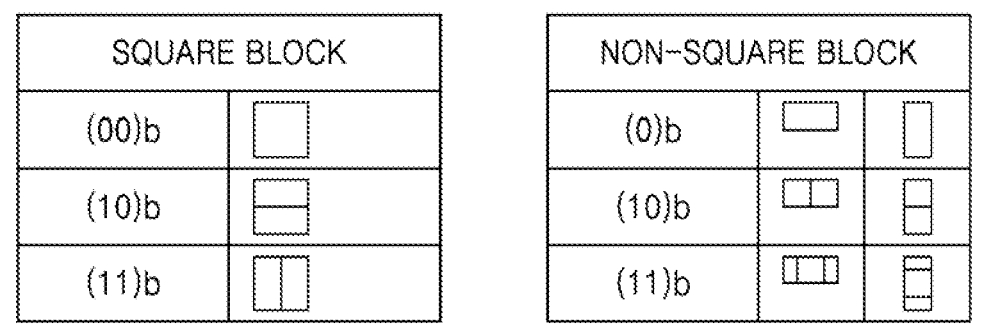

FIG. 19 illustrates other shapes of coding units that can be determined based on split shape mode information that can be represented with a binary code, according to an embodiment.

Referring to FIG. 19, the image decoding apparatus 100 may split a coding unit having a square shape in the horizontal direction or the vertical direction, and a coding unit having a non-square shape in the horizontal direction or the vertical direction, based on split shape mode information. That is, the split shape mode information may indicate splitting a coding unit having a square shape in one direction. In this case, a binary code of split shape mode information representing that a coding unit having a square shape is not split may be expressed as (0)b. In the case in which a binary code of split shape mode information representing that a coding unit is not split is set to (00)b, a binary code of split shape mode information of 2 bits may need to be all used although there is no split shape mode information set to (01)b. However, in the case in which three split shapes are used for a coding unit having a square shape, as shown in FIG. 19, the image decoding apparatus 100 can determine that a coding unit is not split by using a binary code (0)b of 1 bit as split shape mode information, thereby efficiently using a bitstream. However, split shapes of a coding unit having a square shape, which are represented by split shape mode information, should be not interpreted to be limited to three shapes shown in FIG. 19, and should be interpreted to be various shapes including the above-described embodiments.

According to an embodiment, block shape information or split shape mode information may be expressed by using a binary code, and the block shape information or split shape mode information may be generated directly as a bitstream. Also, block shape information or split shape mode information that can be expressed with a binary code may be used as an input binary code in context adaptive binary arithmetic coding (CABAC), instead of being generated directly as a bitstream.

A process in which the image decoding apparatus 100 obtains a syntax for block shape information or split shape mode information through CABAC, according to an embodiment, will be described. The image decoding apparatus 100 may obtain a bitstream including a binary code for the syntax through the bitstream obtainer 110. The image decoding apparatus 100 may de-binarize a bin string included in the obtained bitstream to detect a syntax element representing block shape information or split shape mode information. According to an embodiment, the image decoding apparatus 100 may obtain a group of binary bin strings corresponding to a syntax element to be decoded, and decode the individual bins by using probability information. The image decoding apparatus 100 may repeat the operation until a bin string configured with the decoded bins is identical to one of previously obtained bin strings. The image decoding apparatus 100 may perform de-binarization on the bin string to determine a syntax element.

According to an embodiment, the image decoding apparatus 100 may perform a decoding process of adaptive binary arithmetic coding to determine a syntax for the bin string, and the image decoding apparatus 100 may update a probability model for the bins obtained through the bitstream obtainer 110. Referring to FIG. 18, the bitstream obtainer 110 of the image decoding apparatus 100 may obtain a bitstream that represents a binary code representing split shape mode information, according to an embodiment. The image decoding apparatus 100 may determine a syntax for the split shape mode information by using the obtained binary code having a size of 1 or 2 bits. The image decoding apparatus 100 may update a probability for each bit of the binary code of 2 bits, in order to determine the syntax for the split shape mode information. That is, the image decoding apparatus 100 may update, according to which one of 0 or 1 a value of a first bin of the binary code of 2 bits is, a probability that the next bin will have a value of 0 or 1 upon decoding.

According to an embodiment, in the process of determining the syntax, the image decoding apparatus 100 may update probabilities for the bins that are used in a process of decoding the bins of the bin string for the syntax, and the image decoding apparatus 100 may determine that a specific bit of the bin string has the same probability, without updating a probability of the specific bit.

Referring to FIG. 18, in a process of determining a syntax by using a bin string representing split shape mode information for a coding unit having a non-square shape, the image decoding apparatus 100 may determine a syntax for the split shape mode information by using a bin having a value of 0 in the case in which the coding unit having the non-square shape is not split. That is, when block shape information represents that a current coding unit has a non-square shape, a first bin of the bin string for the split shape mode information may be 0 in the case in which the coding unit having the non-square shape is not split, and may be 1 in the case in which the coding unit is split into two or three coding units. Accordingly, a probability that the first bin of the bin string of the split shape mode information for the coding unit having the non-square shape will be 0 may be ⅓, and a probability that the first bin will be 1 may be ⅔. Because split shape mode information representing that a coding unit having a non-square shape is not split can be expressed with a bin string of 1 bit having a value of 0, as described above, the image decoding apparatus 100 may determine, only in the case in which the first bin of the split shape mode information is 1, whether a second bin is 0 or 1 to determine the syntax for the split shape mode information. According to an embodiment, when the first bin for the split shape mode information is 1, the image decoding apparatus 100 may determine that a probability that the second bin will be 0 is equal to a probability that the second bin will be 1, and decode the second bin.

Accordingly, the image decoding apparatus 100 may use, in the process of determining the bins of the bin string for the split shape mode information, various probabilities for the individual bins. According to an embodiment, the image decoding apparatus 100 may determine different probabilities of bins for split shape mode information according to an extension direction of a non-square block. According to an embodiment, the image decoding apparatus 100 may determine different probabilities of bins for split shape mode information according to a width of a current coding unit or a length of a longer side of the current coding unit. According to an embodiment, the image decoding apparatus 100 may determine different probabilities of bins for split shape mode information according to at least one of a shape of a current coding unit and a length of a longer side of the current coding unit.

According to an embodiment, the image decoding apparatus 100 may determine that probabilities of bins for split shape mode information are the same with respect to coding units that are equal to or larger than a preset size. For example, the image decoding apparatus 100 may determine that probabilities of bins for split shape mode information are the same with respect to coding units of which lengths of longer sides are equal to or greater than 64 samples.

According to an embodiment, the image decoding apparatus 100 may determine initial probabilities for bins constituting a bin string of split shape mode information based on a slice type (for example, an I slice, a P slice, or a B slice).

Figure 20:
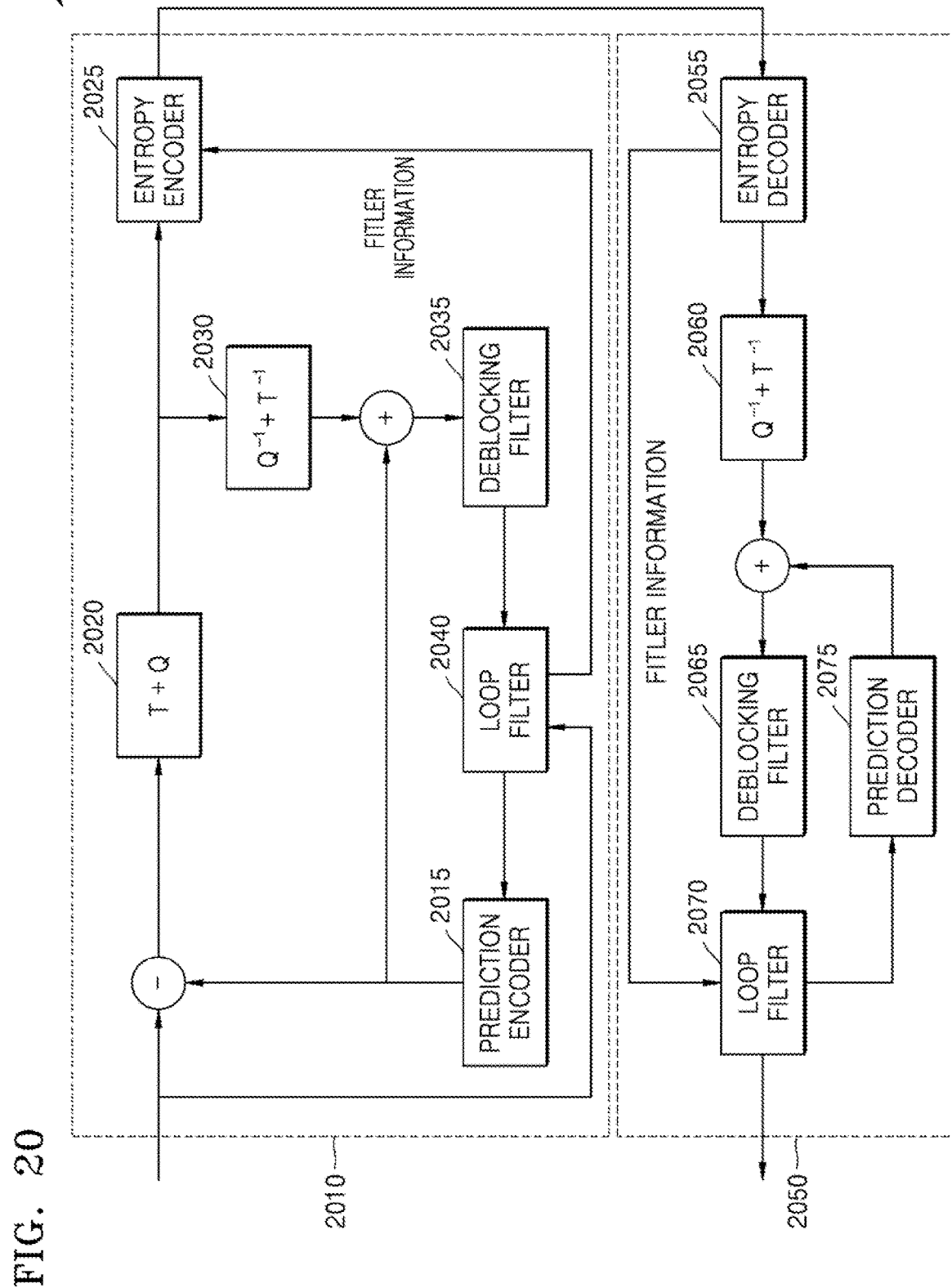
FIG. 20 is a block diagram of an image encoding and decoding system that performs loop filtering.

FIG. 20 is a block diagram of an image encoding and decoding system that performs loop filtering.

An encoder 2010 of an image encoding and decoding system 2000 may transmit an encoded bitstream of an image, and a decoder 2050 of the image encoding and decoding system 2000 may receive a bitstream and decode the bitstream to output a reconstructed image. Herein, the encoder 2010 may be a configuration that is similar to the image encoding apparatus 200 which will be described at a later time, and the decoder 2050 may be a configuration that is similar to the image decoding apparatus 100.

In the encoder 2010, a prediction encoder 2015 may output prediction data through inter prediction and intra prediction, and a transformation and quantization unit 2020 may output a quantized transform coefficient of residual data between the prediction data and a current input image. An entropy encoder 2025 may encode the quantized transform coefficient to transform the quantized transform coefficient, and output the quantized transform coefficient as a bitstream. The quantized transform coefficient may be reconstructed as spatial-domain data through a dequantization and inverse-transformation unit 2030, and the reconstructed spatial-domain data may be output as a reconstructed image through a deblocking filter 2035 and a loop filter 2040. The reconstructed image may be used as a reference image of a next input image by a prediction encoder 2015.

Encoded image data of a bitstream received by the decoder 2050 may be reconstructed as spatial-domain residual data through an entropy decoder 2055 and a dequantization and inverse-transformation unit 2060. Prediction data output from a prediction decoder 2075 may be combined with the residual data to construct spatial-domain image data, and a deblocking filter 2065 and a loop filter 2070 may filter the spatial-domain image data and output a reconstructed image for a current original image. The reconstructed image may be used as a reference image for a next original image by the prediction decoder 2075.

The loop filter 2040 of the encoder 2010 may perform loop filtering by using filter information input according to a user input or a system setting. The filter information used by the loop filter 2040 may be output to the entropy encoder 2025, and transmitted to the decoder 2050 together with encoded image data. The loop filter 2070 of the decoder 2050 may perform loop filtering based on filter information input from the decoder 2050.

Various embodiments described above describe operations related to an image decoding method that is performed by the image decoder 100. Hereinafter, operations of the image encoding apparatus 200 that performs an image encoding method corresponding to a reverse order of the image decoding method will be described through various embodiments.

Figure 2:
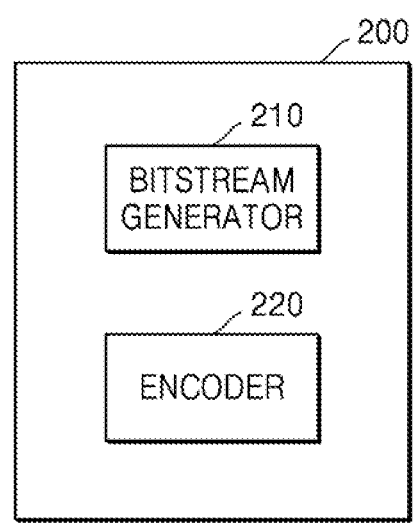
FIG. 2 is a block diagram of an image encoding apparatus according to an embodiment.

FIG. 2 is a block diagram of the image encoding apparatus 200 capable of encoding an image based on at least one of block shape information and split shape mode information, according to an embodiment.

The image encoding apparatus 200 may include an encoder 220 and a bitstream generator 210. The encoder 220 may receive an input image and encode the input image. The encoder 220 may encode the input image to obtain at least one syntax element. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 220 may determine a context model based on block shape information including at least one of a shape, a direction, a ratio of a height and a width, or a size of a coding unit.

The bitstream generator 210 may generate a bitstream based on an encoded input image. For example, the bitstream generator 210 may generate a bitstream by performing entropy encoding on a syntax element based on a context model. Also, the image encoding apparatus 200 may transmit the bitstream to the image decoding apparatus 100.

According to an embodiment, the encoder 220 of the image encoding apparatus 200 may determine a shape of a coding unit. For example, a coding unit may have a square shape or a non-square shape, and information representing such a shape may be included in block shape information.

According to an embodiment, the encoder 220 may determine a shape into which a coding unit is to be split. The encoder 220 may determine a shape of at least one coding unit included in a coding unit, and the bitstream generator 210 may generate a bitstream including split shape mode information including information about the shape of the coding unit.

According to an embodiment, the encoder 220 may determine whether or not to split a coding unit. When the encoder 220 determines that a coding unit includes only one coding unit or that a coding unit is not split, the bitstream generator 210 may generate a bitstream including split shape mode information representing that the coding unit is not split. Also, the encoder 220 may split a coding unit into a plurality of coding units included in the coding unit, and the bitstream generator 210 may generate a bitstream including split shape mode information representing that a coding unit is to be split into a plurality of coding units.

According to an embodiment, information representing the number of coding units into which a coding unit is split or a direction in which the coding unit is split may be included in the split shape mode information. For example, the split shape mode information may represent splitting in at least one direction of a vertical direction and a horizontal direction or may represent non-splitting.

The image encoding apparatus 200 may determine split shape mode information based on a split shape mode of a coding unit. The image encoding apparatus 200 may determine a context model based on at least one of a shape, a direction, a ratio of a width and a height, or a size of the coding unit. Also, the image encoding apparatus 200 may generate information about a split shape mode for splitting the coding unit as a bitstream based on the context model.

To determine the context model, the image encoding apparatus 200 may obtain an arrangement for corresponding at least one of a shape, a direction, a ratio of a width and a height, or a size of the coding unit to an index for the context model. The image encoding apparatus 200 may obtain the index for the context model based on at least one of the shape, the direction, the ratio of the width and the height, or the size of the coding unit, from the arrangement. The image encoding apparatus 200 may determine the context model based on the index for the context model.

To determine the context model, the image encoding apparatus 200 may determine the context model further based on block shape information including at least one of a shape, a direction, a ratio of a width and a height, or a size of a surrounding coding unit being adjacent to the coding unit. Also, the surrounding coding unit may include at least one of coding units located to the left-lower side, left side, left-upper side, upper side, right-upper side, right side, or right-lower side of the coding unit.

Also, to determine the context model, the image encoding apparatus 200 may compare a length of a width of the upper surrounding coding unit with a length of the width of the coding unit. Also, the image encoding apparatus 200 may compare lengths of heights of the left and right surrounding coding units with a length of the height of the coding unit. Also, the image encoding apparatus 200 may determine the context model based on results of the comparisons.

Operations of the image encoding apparatus 200 include content that is similar to those of the image decoding apparatus 100 described above with reference to FIGS. 3 to 20, and therefore, detailed descriptions thereof will be omitted.

Hereinafter, an image encoding apparatus 3000 and an image decoding apparatus 2100 for encoding and decoding an image through bi-directional prediction will be described with reference to FIGS. 21 to 32.

Figure 21:
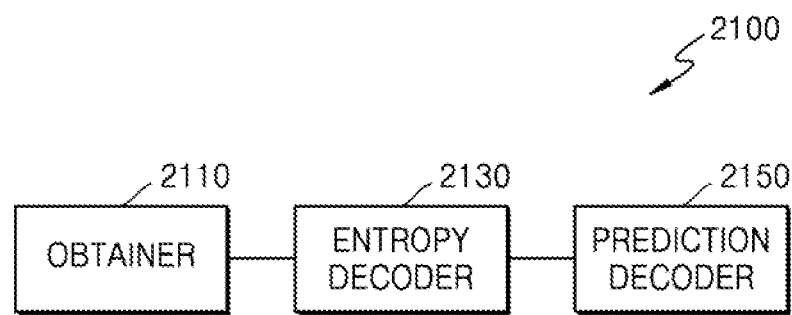
FIG. 21 is a block diagram illustrating a configuration of an image decoding apparatus according to an embodiment.

FIG. 21 is a block diagram illustrating a configuration of the image decoding apparatus 2100 according to an embodiment.

Referring to FIG. 21, the image decoding apparatus 2100 according to an embodiment may include an obtainer 2110, an entropy decoder 2130, and a prediction decoder 2150.

The obtainer 2110 shown in FIG. 21 may correspond to the bitstream obtainer 110 shown in FIG. 1, and the entropy decoder 2130 and the prediction decoder 2150 may correspond to the decoder 120 shown in FIG. 1. Also, the entropy decoder 2130 and the prediction decoder 2150 may respectively correspond to the entropy decoder 2055 and the prediction decoder 2075 shown in FIG. 20.

The obtainer 2110, the entropy decoder 2130, and the prediction decoder 2150, according to an embodiment, may be implemented as at least one processor. The image decoding apparatus 2100 may include one or more memories (not shown) for storing input and output data of the obtainer 2110, the entropy decoder 2130, and the prediction decoder 2150. Also, the image decoding apparatus 2100 may include a memory controller (not shown) for controlling data inputs and outputs of the memory (not shown).

The obtainer 2110 may receive a bitstream generated as a result of encoding of an image. The bitstream may include information to be used to reconstruct a current block. The current block may be a block generated by being split from the image according to a tree structure, and may correspond to a block unit, such as, for example, a largest coding unit, a coding unit, or a transform unit, etc.

The prediction decoder 2150 may determine a current block based on block shape information and/or split shape mode information included in a bitstream corresponding to at least one level among a sequence parameter set, a picture parameter set, a video parameter set, a slice header, and a slice segment header.

The bitstream may include information representing a prediction mode of the current block. The prediction mode of the current block may include an intra mode, an inter mode, a merge mode, etc. The inter mode, the merge mode, etc. may be modes for predicting and reconstructing a current block based on a reference image in order to reduce temporal redundancy between images.

According to an embodiment, a reference image may be used (that is, uni-directional prediction) or two reference images may be used (that is, bi-directional prediction) to reconstruct a current block based on a reference image(s). Whether a current block will be subject to uni-directional prediction or bi-directional prediction may be determined according to explicit information included in a bitstream, or implicitly determined from a prediction mode of surrounding blocks related to the current block.

The entropy decoder 2130 may perform entropy decoding on data included in the bitstream to obtain syntax elements to be used for reconstructing the current block. According to an embodiment, the entropy decoder 2130 may perform entropy decoding on the data included in the bitstream according to CABAC.

When the current block is subject to bi-directional prediction, the entropy decoder 2130 may perform entropy decoding on weight information included in the bitstream to obtain a weight index corresponding to a syntax element. Herein, the weight information may include a result value obtained by performing arithmetic encoding on a binary string obtained by binarizing the weight index. Accordingly, as a result of arithmetic decoding of the weight information, the binary string corresponding to the weight index may be reconstructed, and the binary string may be de-binarized to obtain the weight index. The binary string obtained by binarizing the weight index and the binary string obtained by performing arithmetic decoding on the weight information may be referred to as bin strings.

According to an embodiment, the entropy decoder 2130 may reconstruct, upon arithmetic decoding of weight information, a first binary value of a binary string corresponding to a weight index based on a context model, and reconstruct the remaining binary values of the binary string by a bypass method. That is, because the context model is used only for the first binary value, entropy decoding may be simplified.

The entropy decoder 2130 will be described in detail with reference to FIGS. 22 to 24.

Figure 22:
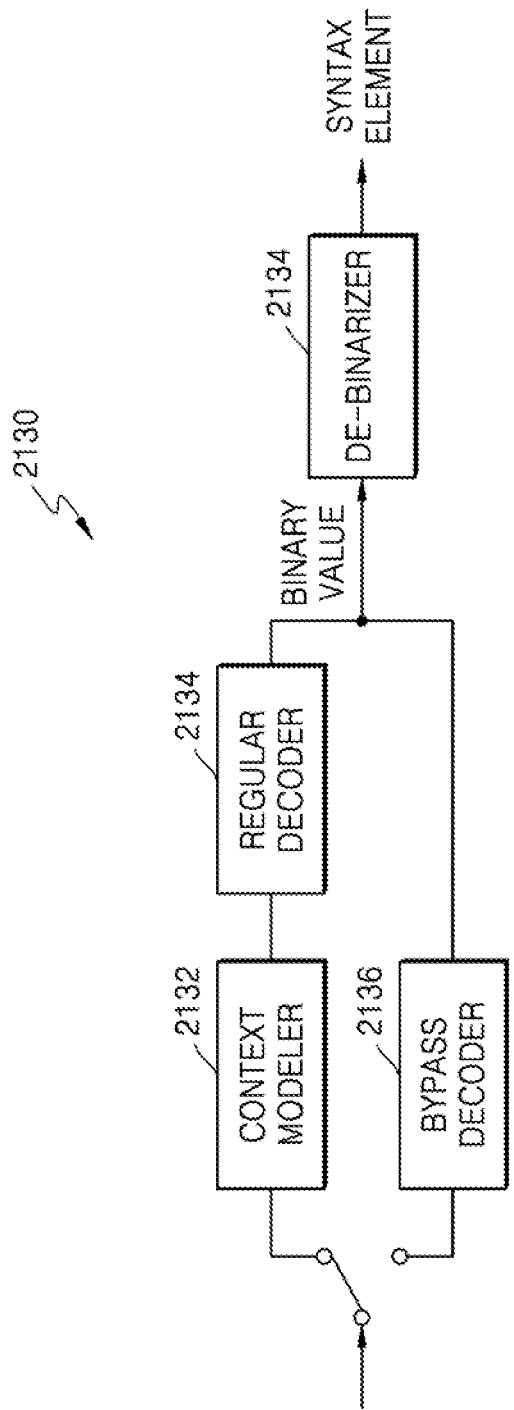
FIG. 22 illustrates a configuration of an entropy decoder shown in FIG. 21.

FIG. 22 illustrates a configuration of the entropy decoder 2130 shown in FIG. 21.

Referring to FIG. 22, the entropy decoder 2130 may include a context modeler 2132, a regular decoder 2134, a bypass decoder 2136, and a de-binarizer 2138. The entropy decoder 2130 may perform a reverse process of an entropy encoding process that is performed by an entropy encoder 3030 which will be described later.

A bitstream may be configured with binary values, and the binary values may be obtained by performing arithmetic encoding on a binary string corresponding to syntax elements determined during an image encoding process.

Data included in the bitstream may be arithmetically decoded to binary values (that is, the binary string) corresponding to the syntax elements through the regular decoder 2134 or the bypass decoder 2136. The data included in the bitstream may be input to the regular decoder 2134 or the bypass decoder 2136 according to types of the syntax elements.

The regular decoder 2134 may perform arithmetic decoding on the binary values based on a probability model determined by the context modeler 2132. The context modeler 2132 may provide the probability model for the binary values to be currently reconstructed, to the regular decoder 2134. More specifically, the context modeler 2132 may determine a probability of a preset binary value based on a previously decoded binary value, update a probability of a binary value used to decode the previously decoded binary value, and output the updated probability to the regular decoder 2134.

According to an embodiment, the context modeler 2132 may determine a context model by using a context index ctxIdx, and determine an occurrence probability of a Least Probable Symbol (LPS) or a Most Probable Symbol (MPS) which the context model has, and information valMPS about which one of 0 and 1 corresponds to an MPS. According to another embodiment, the context modeler 2132 may determine a probability (for example, P(1) representing an occurrence probability of, for example, "1") of a predetermined, preset binary value based on previously decoded binary values, without distinguishing an MPS from an LPS, and provide the probability of the preset binary value to the regular decoder 2134.

The regular decoder 2134 may perform binary arithmetic decoding based on the probability of the preset binary value provided from the context modeler 2132 and the data included in the bitstream. More specifically, the regular decoder 2134 may determine an occurrence probability P(1) of "1" and an occurrence probability P(0) of "0" based on the probability of the preset binary value provided from the context modeler 2132. Also, the regular decoder 2134 may split a preset range representing a probability section according to the occurrence probabilities P(0) and P(1) of "0" and "1", and output a binary value corresponding to a section to which the data included in the bitstream belongs.

The bypass decoder 2136 may fix the occurrence probability P(1) of "1" and the occurrence probability P(0) of "0" to a predetermined value, for example, 0.5, split a preset range representing a probability section according to the occurrence probabilities P(1) and P(0), and output a binary value corresponding to a section to which the data included in the bitstream belongs. Because the bypass decoder 2136 does not use a context model unlike the regular decoder 2134, the bypass decoder 2136 may perform high-speed arithmetic decoding.

The de-binarizer 2138 may de-binarize a binary string being an arrangement of binary values output from the regular decoder 2134 and the bypass decoder 2136 to output a syntax element. For the de-binarization of the binary string, one of fixed length de-binarization, truncated rice de-binarization, k-th order exp-golomb de-binarization, and golomb rice de-binarization may be used.

As described above, the entropy decoder 2130 may reconstruct, upon arithmetic decoding of weight information included in a bitstream, a first binary value based on a context model and reconstruct the remaining binary values by a bypass method. In other words, a first binary value of a binary string corresponding to a weight index may be reconstructed by the regular decoder 2134, and the remaining binary value may be reconstructed by the bypass decoder 2136.

FIG. 23 is a reference table for determining context information of a binary string corresponding to a weight index.

Referring to FIG. 23, it is seen that a binary value (that is, a first binary value) having binIdx of 0 among binary values of Bcw_idx representing weight indexes is reconstructed according to context of 0, and binary values having binIdx that is greater than 0 are reconstructed by the bypass method.

After the arithmetic decoding of the weight information is completed by the entropy decoder 2130, a weight index corresponding to a syntax element may be obtained through de-binarization of the binary string.

FIG. 24 is a table representing candidate values included in a weight candidate group and weight indexes and binary strings corresponding to the candidate values.

Referring to FIG. 24, weight indexes may be assigned to candidate values used for bi-directional prediction of a current block, and the individual weight indexes may be binarized by the truncated rice binarization. For example, a weight index 0 may be expressed with a binary value, and a weight index 1 may be expressed with two binary values. That is, weight indexes may be expressed with different numbers of binary values. However, according to an implementation example, a weight index having a greatest value and a weight index having a second-greatest value may be expressed with the same number of binary values based on the truncated rice binarization. The kinds/numbers of candidate values shown in FIG. 24 and weight indexes assigned to the respective candidate values are examples, and may change variously within a range that is apparent to one of ordinary skill in the related art.

It has been described above that, upon arithmetic decoding of weight information, a first binary value is reconstructed based on a context model and the remaining binary values are reconstructed by the bypass method. The reason may be because i) when a selection probability of a candidate value indicated by a weight index 0 is highest, it is efficient to reconstruct a first binary value by accumulating changes of a probability of 0 and a probability of 1 according to a context model, and ii) because selection probabilities of candidate values indicated by other weight indexes except for 0 are lower than the selection probability of the candidate value indicated by the weight index 0, and accordingly, it is more efficient to reconstruct binary values by the bypass method than to reconstruct the binary values based on a context model.

The prediction decoder 2150 may use a candidate value indicated by a weight index obtained as a result of entropy decoding of weight information for bi-directional prediction of a current block. More specifically, when the weight index is 0, a candidate value of 4 may be used for bi-directional prediction of a current block, and, when the weight index is 1, a candidate value of 5 may be used for bi-directional prediction of a current block.

Hereinafter, a method performed by the prediction decoder 2150 of reconstructing a current block through bi-directional prediction using a weight will be described.

Figure 25:
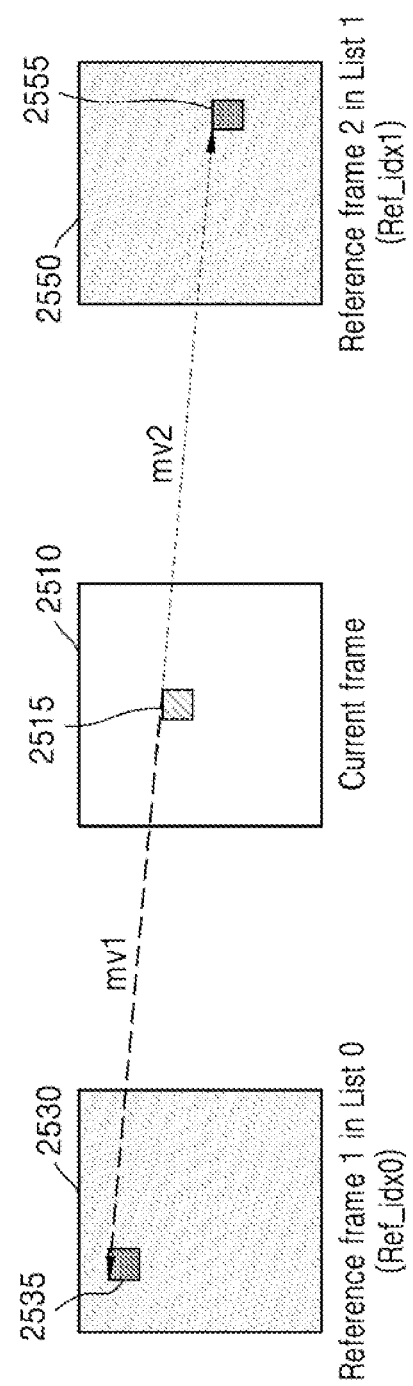
FIG. 25 is a view for describing bi-directional prediction of a current block.

FIG. 25 is a view for describing bi-directional prediction of a current block 2515.

The current block 2515 included in a current image 2510 may be subject to uni-directional prediction by using a first reference image 2530 included in a list 0 or a second reference image 2550 included in a list 1, or may be subject to bi-directional prediction by using the first reference image 2530 included in the list 0 and the second reference image 2550 included in the list 1.

The prediction decoder 2150 may determine the first reference image 2530 and the second reference image 2550 to be referred to by the current block 2515 for bi-directional prediction of the current block 2515, and determine a first motion vector mv1 indicating the first reference block 2535 in the first reference image 2530 and a second motion vector mv2 indicating the second reference block 2555 in the second reference image 2550. More specifically, the prediction decoder 2150 may select the first reference image 2530 and the second reference image 2550 as images to be referred to by the current block 2515 based on information included in a bitstream, or the prediction decoder 2150 may select the first reference image 2530 and the second reference image 2550 as images to be referred to by the current block 2515 in consideration of images referred to by surrounding blocks related to the current block 2515.

To determine the first motion vector mv1 and the second motion vector mv2, the prediction decoder 2150 may generate a motion vector candidate list by using motion vectors of a temporal block temporally related to the current block 2515 and a spatial block spatially related to the current block 2515. The prediction decoder 2150 may use the first motion vector mv1 and the second motion vector mv2 by using a motion vector candidate indicated by the information included in the bitstream among motion vector candidates included in the motion vector candidate list.

Figure 26:
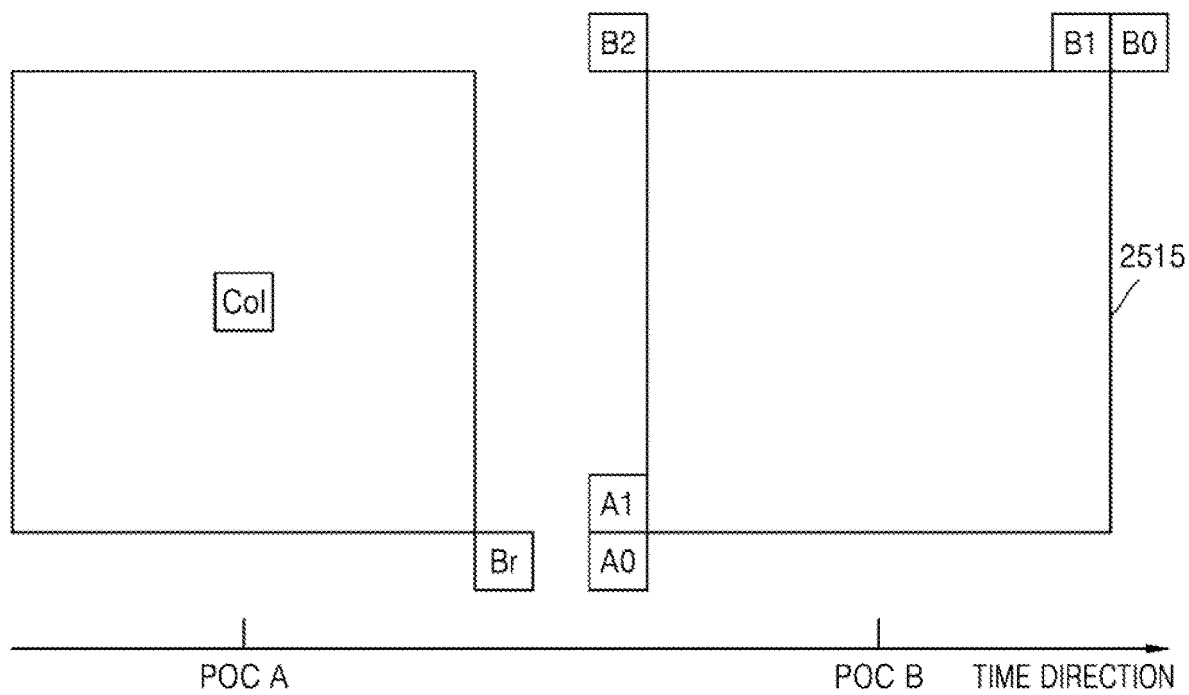
FIG. 26 illustrates blocks temporally and spatially related to a current block.

FIG. 26 illustrates blocks temporally and/or spatially related to the current block 2515.

Referring to FIG. 26, a temporal block may include at least one of a block Col having a different Picture Order Count (POC) from a POC of the current block 2515 and positioned at the same location as the current block 2515 in a reference image, and a block Br being spatially adjacent to the block Col positioned at the same location. The block BR may be positioned to the right lower side of the block Col positioned at the same location as the current block 2515.

A spatial block spatially related to the current block 2515 may include at least one of a left lower outside block A0, a left lower block A1, a right upper outside block B0, an upper right block B1, and a left upper outside block B2.

Locations of temporal blocks and spatial blocks shown in FIG. 26 are examples, and the locations and numbers of the temporal blocks and spatial blocks may change variously according to an implementation example.

According to an embodiment, the prediction decoder 2150 may search for the first reference block 2535 and the second reference block 2555 to be used to reconstruct the current block 2515 directly in the first reference image 2530 and the second reference image 2550. In this case, the prediction decoder 2150 may search for the first reference block 2535 and the second reference block 2555 by the same method as that performed by the image encoding apparatus 3000.

Referring again to FIG. 25, after the first reference block 2535 in the first reference image 2530 and the second reference block 2555 in the second reference image 2550 are determined, the prediction decoder 2150 may combine the first reference block 2535 with the second reference block 2555, and reconstruct the current block 2515 based on the combined result. Herein, combining the first reference block 2535 with the second reference block 2555 may mean linearly combining samples included in the first reference block 2535 with samples included in the second reference block 2555.

For example, the prediction decoder 2150 may determine the combined result of the first reference block 2535 and the second reference block 2555, as the current block 2515. As another example, the prediction decoder 2150 may apply residual data obtained from a bitstream to the combined result of the first reference block 2535 and the second reference block 2555, thereby reconstructing the current block 2515. Herein, the residual data may represent a difference between the combined result of the first reference block 2535 and the second reference block 2555 and the current block 2515.

The prediction decoder 2150 may combine the first reference block 2535 with the second reference block 2555 according to Equation 1 below.

$$pbSamples[x][y]=(w0*predSamplesL0[x][y]+ w1*predSamplesL1[x][y]+offset3)>>>(shift2+3) \quad \text{[Equation 1]}$$

In Equation 1, pbSamples[x][y] represents a combined result of a sample positioned at a location (x, y) in the first reference block 2535 and a sample positioned at a location (x, y) in the second reference block 2555, predSamplesL0[x][y] represents a sample positioned at a location (x, y) of a first reference block in the first reference image 2530 included in the list 0, and predSamplesL1[x] [y] represents a sample positioned at a location (x, y) of a second reference block in the second reference image 2550 included in the list 1. Also, offset3 and shift2 are predetermined values.

In Equation 1, w1 represents a candidate value corresponding to a weight index, and w0 represents a pair value of w1. A pair value means a value obtained by applying a candidate value corresponding to a weight index to a preset operation equation. For example, w0 may have a value of 8−w1. According to an implementation example, w0 may be a candidate value corresponding to a weight index, and w1 may be a pair value of w0.

As described above, when a candidate value indicated by a weight index among candidate values included in a weight candidate group is confirmed, the corresponding candidate value may be used as a weight for combining a first reference block with a second reference block. That is, according to an embodiment, by selecting, when a first reference block is combined with a second reference block for bi-directional prediction of a current block, a weight by which a combined result being most similar to the current block can be deduced, a size of residual data included in a bitstream may be reduced.

Meanwhile, because indexes respectively indicating candidate values included in a weight candidate group are binarized by, for example, the truncated rice binarization to be expressed with different numbers of binary values, which indexes are assigned to which candidate values may be important in view of a bitrate. In other words, when a smallest index is assigned to a candidate value having a greatest probability to be used for bi-directional prediction of a current block among candidate values included in a weight candidate group, the corresponding index may be expressed with a small number of bits. For example, when a candidate value having a greatest probability to be used for bi-directional prediction of a current block among the candidate values shown in FIG. 24 is −2 and an index of 4 is assigned to the candidate value of −2, four binary values (that is, 1111) may be needed to express the index of 4, and therefore, a disadvantage exists in view of a bitrate compared with a case of assigning an index of 0 to the candidate value of −2.

Accordingly, the prediction decoder 2150 according to an embodiment may adaptively assign indexes to candidate values included in a weight candidate group. Hereinafter, adaptively assigning indexes means that indexes to be assigned to candidate values can change according to preset criterion, instead of respectively applying the same indexes to the candidate values. Hereinafter, this will be described in detail.

According to an embodiment, the prediction decoder 2150 may adaptively set indexes for candidate values according to an accumulative number of times which the candidate values have been selected, for bi-directional prediction of previous blocks decoded earlier than a current block. For example, the prediction decoder 2150 may assign indexes of smaller values to candidate values having greater accumulative numbers of times which the candidate values have been selected.

Figure 27:
FIG. 27 is a view for describing that indexes assigned to candidate values included in a weight candidate group may change according to accumulative numbers of times the candidate values have been selected.

FIG. 27 is a view for describing that indexes of candidate values can change according to accumulative numbers of times which the candidate values included in a weight candidate group have been selected.

As shown in FIG. 27, when a candidate value 4 has been selected 19 times, a candidate value 5 has been selected 6 times, a candidate value 3 has been selected 12 times, a candidate value 10 has been selected 3 times, and a candidate value −2 has been selected 7 times in previous blocks, indexes of values increasing in an order of the candidate values 4, 3, −2, 5, and 10 may be respectively assigned to the corresponding candidate values.

The prediction decoder 2150 may assign indexes to candidate values, respectively, and combine a first reference block with a second reference block by using a candidate value corresponding to a weight index, as described above.

According to an embodiment, the prediction decoder 2150 may newly assign indexes to candidate values, respectively, for each image, each slice, each tile, or each block. Herein, a block may include a largest coding unit, a coding unit, or a transform unit.

For example, when indexes are newly assigned to candidate values in unit of an image, the prediction decoder 2150 may calculate, before decoding a current image including a current block, accumulative numbers of times which the candidate values have been selected for bi-directional prediction of previous blocks included in previous images, and assign indexes to candidate values to be used for bi-directional prediction of blocks in a current image according to the accumulative numbers of times.

According to another example, when indexes are newly assigned to candidate values in unit of a slice, the prediction decoder 2150 may calculate, before decoding a current slice including a current block, accumulative numbers of times which the candidate values have been selected for bi-directional prediction of previous blocks included in previous slices, and assign indexes to candidate values to be used for bi-directional prediction of blocks in a current slice according to the calculated accumulative numbers of times.

According to another example, when indexes are newly assigned to candidate values in unit of a tile, the prediction decoder 2150 may calculate, before decoding a current tile including a current block, accumulative numbers of times which the candidate values have been selected for bi-directional prediction of previous blocks included in previous tiles, and assign indexes to candidate values to be used for bi-directional prediction of blocks in the current tile according to the calculated accumulative numbers of times.

According to another example, when indexes are newly assigned to candidate values in unit of a block, the prediction decoder 2150 may calculate, before decoding a current block, accumulative numbers of times which the candidate values have been selected for bi-directional prediction of previous blocks, and assign indexes to candidate values to be used for bi-directional prediction of the current block according to the calculated accumulative numbers of times.

According to an embodiment, the prediction decoder 2150 may select bi-directionally predicted previous blocks based on a first reference image and a second reference image used for bi-directional prediction of a current block among previous blocks, and set indexes for candidate values according to accumulative numbers of times which the candidate values have been selected, for bi-directional prediction of the corresponding previous blocks. In other words, accumulative numbers of times which candidate values have been selected may be calculated with respect to previous blocks bi-directionally predicted by using the same reference image as a reference image of a current image, and indexes may be assigned according to the accumulative numbers of times. In this case, the prediction decoder 2150 may specify a reference image referred to by a current block from information (for example, ref_idx) indicating reference images used for bi-directional prediction of the current block, and then select a candidate value indicated by a weight index (for example, bcw_idx). Accordingly, the entropy decoder 2130 may reconstruct the information (for example, ref_idx) indicating the reference images used for bi-directional prediction of the current block from a bitstream, and then reconstruct the weight index.

When there is no previous block bi-directionally predicted based on the first reference image and the second reference image used for bi-directional prediction of the current block, the prediction decoder 2150 may assign indexes of predetermined values to candidate values. The reason may be because there is a high probability that the same weight will be selected to combine reference blocks, with respect to blocks bi-directionally predicted based on the same reference image.

According to an embodiment, the prediction decoder 2150 may select a previous image having the same temporal layer as that of a current image in a current Group of Picture (GOP) including the current image from among previous images, and set, for bi-directional prediction of previous blocks included in the selected previous image, indexes to candidate values according to accumulative numbers of times which the candidate values have been selected. A temporal layer may mean decoding levels or decoding orders of images included in a GOP.

According to an embodiment, the prediction decoder 2150 may obtain information of indexes respectively assigned to candidate values from a bitstream corresponding to a level of an image, a slice, a tile, or a block, and assign the indexes to the candidate values in unit of a block, a tile, a slice, or an image according to the obtained information. Herein, a block may include a largest coding unit, a coding unit, or a transform unit.

According to an embodiment, the prediction decoder 2150 may assign an index (for example, an index of 0) of a predetermined value to a predetermined candidate value among the candidate values, and adaptively assign indexes to the remaining candidate values according to preset criterion (for example, accumulative numbers of times which the candidate values have been selected in previous blocks).

The prediction decoder 2150 may adaptively determine the number of candidate values included in a weight candidate group for each image, each slice, each tile, or each block. Herein, adaptively determining the number of candidate values means changing the number of the candidate values variously according to preset criterion, without determining the number of the candidate values to be the same number. Accordingly, when the number of candidate values included in a weight candidate group is determined in unit of an image, the prediction decoder 2150 may use, upon bi-directional prediction decoding of blocks included in a current image, a weight candidate group including 5 candidate values (for example, 4, 5, 3, 10, −2), and use, upon bi-directional prediction decoding of blocks included in a next image, a weight candidate group including 3 candidate values (for example, 3, 4, 5). According to an implementation example, when the number of candidate values included in a weight candidate group is determined, the prediction decoder 2150 may adaptively assign indexes to the corresponding candidate values, as described above.

According to an embodiment, the prediction decoder 2150 may adaptively determine the number of candidate values included in a weight candidate group based on at least one of a POC of a first reference image and a POC of a second reference image.

For example, the prediction decoder 2150 may adaptively determine the number of candidate values included in a weight candidate group, based on at least one of a result of comparison between the POC of the first reference image and the POC of the current image and a result of comparison between the POC of the second reference image and the POC of the current image.

For example, the prediction decoder 2150 may adaptively determine the number of candidate values included in a weight candidate group in consideration of whether the POC of the first reference image and the POC of the second reference image are greater or smaller than the POC of the current image. When both the POC of the first reference image and the POC of the second reference image are smaller than or equal to the POC of the current image, the prediction decoder 2150 may determine the number of candidate values included in a weight candidate group to be m (m is a natural number), and, when at least one of the POC of the first reference image and the POC of the second reference image is greater than the POC of the current image, the prediction decoder 2150 may determine the number of candidate values included in a weight candidate group to be n (n is a natural number which is different from m). For example, when m is 5, the candidate values included in the weight candidate group may be 4, 5, 3, 10, and −2, and, when n is 3, the candidate values included in the weight candidate group may be 3, 4, and 5.

For example, the prediction decoder 2150 may adaptively determine the number of candidate values included in a weight candidate group based on count information included in a bitstream.

Also, for example, the prediction decoder 2150 may adaptively determine the number of candidate values included in a weight candidate group according to a type of a current image. When a current image is a preset type, the prediction decoder 2150 may determine the number of candidate values included in a weight candidate group to be 5 (for example, 4, 5, 3, 10, −2), and, when the current image is not the preset type, the prediction decoder 2150 may determine the number of candidate values included in a weight candidate group to be 3 (for example, 3, 4, and 5).

In regard of Equation 1, it has been described that, when a first reference block is combined with a second reference block, a candidate value is determined according to a weight index, a pair value is determined from the candidate value, and the candidate value and the pair value are applied to the first reference block and the second reference block, respectively. When the candidate value is w1, the pair value w0 may be 8-w1. Referring to the candidate values shown in FIG. 24, it is seen that the pair value w0 is also included as a candidate value in the weight candidate group. For example, when a candidate value indicated by a weight index is 5, a pair value of 5 is 3 (8−5), and 3 is also included as a candidate value in a table shown in FIG. 24. Also, when a candidate value indicated by a weight index is 10, a pair value of 10 is −2 (8−10), and −2 is also included as a candidate value in the table.

That is, 5 is paired with 3 and 10 is paired with −2, among the candidate values shown in FIG. 24. When 5 or 10 is selected from among the candidate values, 3 and −2 may be always deduced as pair values. By including 3 and −2 in the weight candidate group, various combinations of candidate values to be applied to the first reference block and the second reference block may be determined. However, a large number of candidate values included in a weight candidate group may be a disadvantage in view of a bitstream. The reason may be because a larger number of candidate values included in a weight candidate group results in a larger number of binary values respectively representing candidate values.

According to an embodiment, the prediction decoder 2150 may include only candidate values not being in a pair relationship in the weight candidate group. FIG. 28 is a table representing candidate values included in a weight candidate group and weight indexes and binary strings corresponding to the candidate values. Comparing with FIG. 24, FIG. 28 shows that 3 paired with 5 and −2 paired with 10 do not exist in the weight candidate group. According to an implementation example, 3 and −2, instead of 5 and 10, may be included in the weight candidate group. Because a total number of candidate values is 3, a greatest index may be expressed with three binary values, and accordingly, the number of bits required to express a weight index may be reduced.

When candidate values included in a weight candidate group are not in a pair relationship, the prediction decoder 2150 may select which ones of a candidate value indicated by a weight index and a pair value of the candidate value are respectively applied to the first reference block and the second reference block. More specifically, when preset criterion is satisfied, the prediction decoder 2150 may apply a candidate value indicated by a weight index to the first reference block and a pair value of the corresponding candidate value to the second reference block. In contrast, when the preset criterion is not satisfied, the prediction decoder 2150 may apply the candidate value indicated by the weight index to the second reference block and a pair value of the corresponding candidate value to the first reference block.

According to an embodiment, the prediction decoder 2150 may select which ones of a candidate value and a pair value are respectively applied to the first reference block and the second reference block, based on a POC of the first reference image and a POC of the second reference image. For example, the prediction decoder 2150 may apply a candidate value to a reference block in a reference image having a POC having a greater difference from a POC of a current image among the first reference image and the second reference image, and apply a pair value to a reference block in the other reference image. As another example, the prediction decoder 2150 may apply a candidate value to a reference block in a reference image having a POC having a smaller difference from a POC of a current image among the first reference image and the second reference image, and apply a pair value to a reference block in the other reference image. As still another example, the prediction decoder 2150 may apply a candidate value to a reference block in a reference image having a greater POC among the first reference image and the second reference image, and apply a pair value to a reference block in the other reference image. In contrast, the prediction decoder 2150 may apply a candidate value to a reference block in a reference image having a smaller POC among the first reference image and the second reference image, and apply a pair value to a reference block in the other reference image. As another example, the prediction decoder 2150 may apply a greater value of a candidate value and a pair value to a reference block in a reference image having a POC having a smaller difference from a POC of a current image among the first reference image and the second reference image, and apply a smaller value of the candidate value and the pair value to a reference block in a reference image having a POC having a greater difference from the POC of the current image among the first reference image and the second reference image. As still another example, the prediction decoder 2150 may apply a greater value of a candidate value and a pair value to a reference block in a reference image having a POC having a greater difference from a POC of a current image among the first reference image and the second reference image, and apply the pair value to a reference block in the other reference image, and apply a smaller value of the candidate value and the pair value to a reference block in a reference image having a POC having a smaller difference from the POC of the current image among the first reference image and the second reference image.

Figure 29:
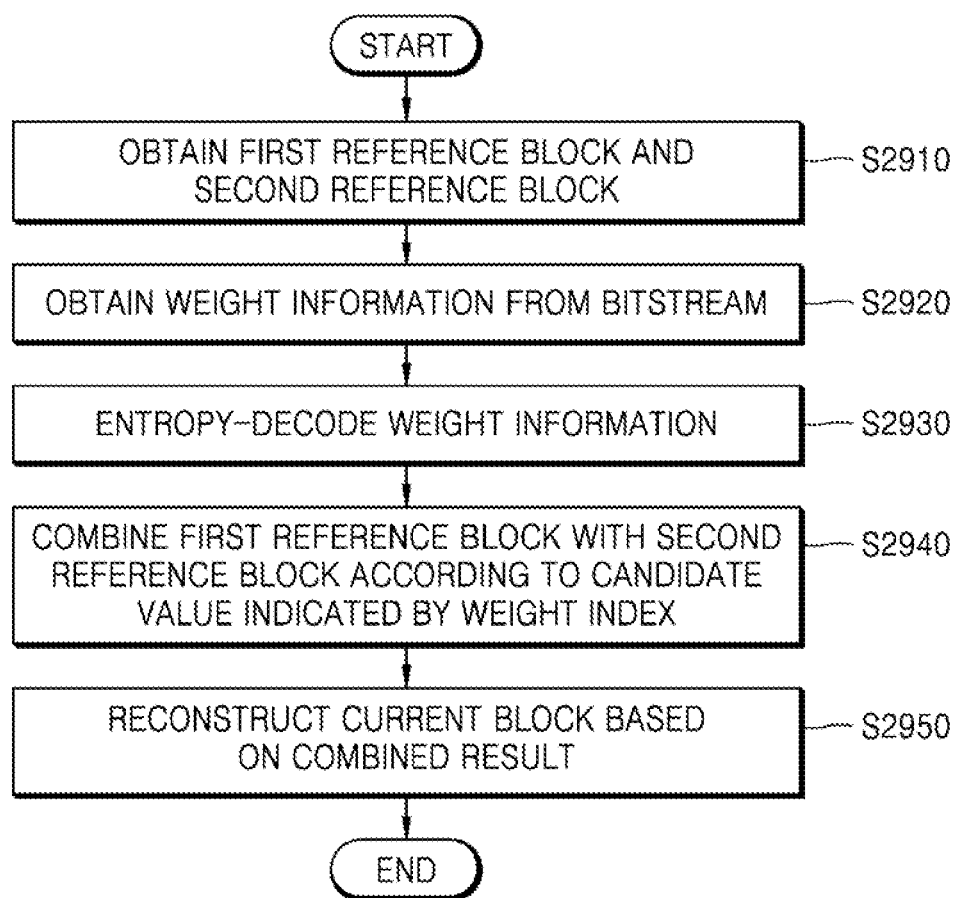
FIG. 29 is a flowchart illustrating an image decoding method according to an embodiment.

FIG. 29 is a flowchart illustrating an image decoding method according to an embodiment.

In operation S2910, the image decoding apparatus 2100 may obtain a first reference block in a first reference image and a second reference block in a second reference image for bi-directional prediction of a current block. The image decoding apparatus 2100 may obtain, from a bitstream, information indicating a first reference image included in a list 0 and a second reference image included in a list 1, and select the first reference image and the second reference image according to the obtained information. Also, the image decoding apparatus 2100 may determine a first motion vector indicating the first reference block in the first reference image and a second motion vector indicating the second reference block in the second reference image.

In operation S2920, the image decoding apparatus 2100 may obtain weight information included in the bitstream, and perform entropy decoding on the weight information to obtain a weight index, in operation S2930.

The image decoding apparatus 2100 may reconstruct a first binary value corresponding to the weight index according to a context model, and reconstruct the remaining binary values according to a bypass method.

In operation S2940, the image decoding apparatus 2100 may combine the first reference block with the second reference block according to a candidate value indicated by the weight index among candidate values included in a weight candidate group, and reconstruct the current block based on the combined result of the first reference block and the second reference block, in operation S2950.

The image decoding apparatus 2100 may determine the combined result of the first reference block and the second reference block as the current block, or the image decoding apparatus 2100 may determine the combined result of the first reference block and the second reference block as a prediction block and sum the prediction block with residual data obtained from the bitstream to reconstruct the current block.

The image decoding apparatus 2100 may adaptively determine the numbers and/or kinds of candidate values to be included in the weight candidate group for each image, each slice, each tile, or each block, in order to select the candidate value indicated by the weight index. To adaptively determine the numbers and/or kinds of candidate values to be included in the weight candidate group, the image decoding apparatus 2100 may use the same method as that performed by the image encoding apparatus 3000 which will be described later.

Figure 30:
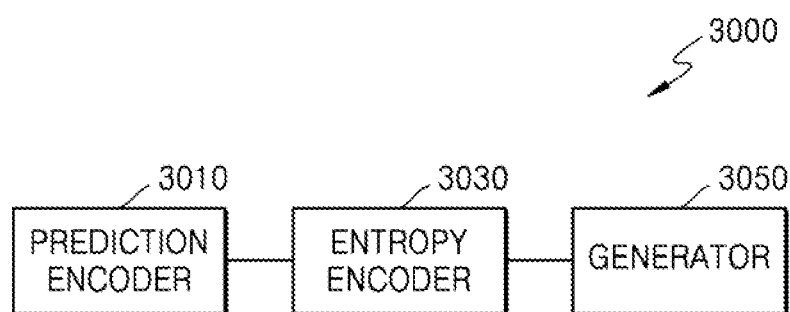
FIG. 30 is a block diagram illustrating a configuration of an image encoding apparatus according to an embodiment.

FIG. 30 is a block diagram illustrating a configuration of the image encoding apparatus 3000 according to an embodiment.

Referring to FIG. 30, the image encoding apparatus 3000 may include a prediction encoder 3010, an entropy encoder 3030, and a generator 3050. The prediction encoder 3010 and the entropy encoder 3030 may correspond to the encoder 20 shown in FIG. 2, and the generator 3050 may correspond to the bitstream generator 210 shown in FIG. 2. Also, the prediction encoder 3010 and the entropy encoder 3030 may respectively correspond to the prediction encoder 2015 and the entropy encoder 2025 shown in FIG. 20.

The prediction encoder 3010 and the entropy encoder 3030, according to an embodiment, may be implemented as at least one processor. The image encoding apparatus 3000 may include at least one memory (not shown) storing input/output data of the prediction encoder 3010, the entropy encoder 3030, and the generator 3050. Also, the image encoding apparatus 3000 may include a memory controller (not shown) for controlling data input/output of the memory (not shown).

The prediction encoder 3010 may determine a prediction mode of a current block. The prediction mode of the current block may include an intra mode, an inter mode, a merge mode, etc. The inter mode, the merge mode, etc. may be a mode for predicting and encoding a current block based on a reference image to reduce temporal redundancy between images. According to an embodiment, to encode a current block based on a reference image, a reference image (that is, uni-directional prediction) or two reference images (that is, bi-directional prediction) may be used.

When a current block is bi-directionally predicted, the prediction encoder 3010 may select a reference image of the current block from among lists 0 and 1. The prediction encoder 3010 may select a first reference image from the list 0, and a second reference image from the list 1.

Also, the prediction encoder 3010 may search for a first reference block for predicting the current block in the first reference image, and search for a second reference block in the second reference image. The prediction encoder 3010 may select the first reference block and the second reference block capable of generating a block having a smallest difference from the current block from the first reference image and the second reference image. As described above, the prediction encoder 3010 may generate a motion vector candidate list by using motion vectors of a temporal block temporally related to the current block and a spatial block spatially related to the current block, determine a first motion vector and a second motion vector from among motion vector candidates included in the motion vector candidate list, and obtain the first reference block indicated by the first motion vector and the second reference block indicated by the second motion vector.

After the first reference block and the second reference block are obtained, the prediction encoder 3010 may select a candidate value to be used to combine the first reference block with the second reference block from among candidate values included in a weight candidate group.

The prediction encoder 3010 may adaptively assign, before selecting the candidate value, indexes to the candidate values included in the weight candidate group.

According to an embodiment, the prediction encoder 3010 may adaptively assign the indexes to the candidate values according to accumulative numbers of times which the candidate values have been selected, for bi-directional prediction of previous blocks encoded earlier than the current block. For example, the prediction encoder 3010 may assign indexes of smaller magnitudes to candidate values selected the greater accumulative number of times. As shown in FIG. 27, when a candidate value 4 has been selected 19 times, a candidate value 5 has been selected 6 times, a candidate value 3 has been selected 12 times, a candidate value 10 has been selected 3 times, and a candidate value −2 has been selected 7 times in previous blocks, indexes of values increasing in an order of the candidate values 4, 3, −2, 5, and 10 may be respectively assigned to the corresponding candidate values.

According to an embodiment, the prediction encoder 3010 may newly assign indexes to candidate values for each image, each slice, each tile, or each block. Herein, a block may include a largest coding unit, a coding unit, or a transform unit.

For example, when indexes are newly assigned to candidate values in unit of an image, the prediction encoder 3010 may calculate, before decoding a current image including a current block, accumulative numbers of times which the candidate values have been selected for bi-directional prediction of previous blocks included in previous images, and assign indexes to candidate values to be used for bi-directional prediction of blocks in the current image according to the accumulative numbers of times. According to another example, when indexes are newly assigned to candidate values in unit of a slice, the prediction encoder 3010 may calculate, before decoding a current slice including a current block, accumulative numbers of times which the candidate values have been selected for bi-directional prediction of previous blocks included in previous slices, and assign indexes to candidate values to be used for bi-directional prediction of blocks in a current slice according to the calculated accumulative numbers of times. According to another example, when indexes are newly assigned to candidate values in unit of a tile, the prediction encoder 3010 may calculate, before decoding a current tile including a current block, accumulative numbers of times which the candidate values have been selected for bi-directional prediction of previous blocks included in previous tiles, and assign indexes to candidate values to be used for bi-directional prediction of blocks in the current tile according to the calculated accumulative numbers of times.

According to an embodiment, the prediction encoder 3010 may select bi-directionally predicted previous blocks based on the first reference image and the second reference image used for bi-directional predication of the current block among the previous blocks, and assign indexes to candidate values according to accumulative numbers of times which the candidate values have been selected for bi-directional prediction of the corresponding previous blocks. In this case, the entropy encoder 3030 may perform entropy encoding on information (for example, ref_idx) indicating reference images used for bi-directional prediction of the current block, and then perform entropy encoding on a weight index (for example, bcw_idx).

According to an embodiment, the prediction decoder 2150 may select a previous image having the same temporal layer as that of the current image in a GOP including the current image from among previous images, and assign indexes to candidate values according to accumulative numbers of times which the candidate values have been selected for bi-directional prediction of previous blocks included in the selected previous image.

According to an embodiment, the prediction encoder 3010 may assign an index (for example, an index of 0) of a predetermined value to a predetermined candidate value among the candidate values, and adaptively assign indexes to the remaining candidate values according to preset criterion (for example, accumulative numbers of times which the candidate values have been selected in previous blocks).

The prediction encoder 3010 may adaptively determine the number of candidate values included in a weight candidate group for each image, each slice, each tile, or each block. When the number of candidate values included in a weight candidate group is determined in unit of an image, the prediction encoder 3010 may use, upon bi-directional prediction encoding of blocks included in a current image, a weight candidate group including 5 candidate values (for example, 4, 5, 3, 10, −2), and use, upon bi-directional prediction encoding of blocks included in a next image, a weight candidate group including 3 candidate values (for example, 3, 4, 5).

According to an embodiment, the prediction encoder 3010 may adaptively determine the number of candidate values included in a weight candidate group based on at least one of a POC of the first reference image and a POC of the second reference image.

For example, the prediction encoder 3010 may determine the number of candidate values included in a weight candidate group, based on at least one of a result of comparison between the POC of the first reference image and the POC of the current image and a result of comparison between the POC of the second reference image and the POC of the current image.

For example, the prediction encoder 3010 may determine the number of candidate values included in a weight candidate group in consideration of whether the POC of the first reference image and the POC of the second reference image are greater or smaller than the POC of the current image. When both the POC of the first reference image and the POC of the second reference image are smaller than or equal to the POC of the current image, the prediction encoder 3010 may determine the number of candidate values included in the weight candidate group to be m (m is a natural number), and, when at least one of the POC of the first reference image and the POC of the second reference image is greater than the POC of the current image, the prediction encoder 3010 may determine the number of candidate values included in the weight candidate group to be n (n is a natural number that is different from m).

Also, for example, the prediction encoder 3010 may adaptively determine the number of candidate values included in the weight candidate group according to a type of a current image. When a current image is a preset type, the prediction encoder 3010 may determine the number of candidate values included in a weight candidate group to be 5 (for example, 4, 5, 3, 10, −2), and, when the current image is not the preset type, the prediction encoder 3010 may determine the number of candidate values included in a weight candidate group to be 3 (for example, 3, 4, 5).

After a candidate value for bi-directional prediction of the current block is selected, the prediction encoder 3010 may combine the first reference block with the second reference block according to the selected candidate value to thereby encode the current block. The prediction encoder 3010 may combine the first reference block with the second reference block according to Equation 1. The prediction encoder 3010 may determine the combined result of the first reference block with the second reference block to be the current block, and transfer information (for example, information indicating the first reference image and the second reference image, information indicating a first motion vector and a second motion vector, etc.) for obtaining the first reference block and the second reference block, and a weight index to the entropy encoder 3030. Alternatively, the prediction encoder 3010 may determine the combined result of the first reference block with the second reference block to be a prediction block, and transfer residual data between the prediction block and the current block, information for obtaining the first reference block and the second reference block, and a weight index to the entropy encoder 3030.

According to an embodiment, the prediction encoder 3010 may include only candidate values not being in a pair relationship in a weight candidate group. By comparing candidate values shown in FIG. 28 with candidate values shown in FIG. 24, it is seen that 3 (for example, a case of pair value=8–candidate value) being in a pair relationship with 5 and −2 being in a pair relationship with 10 do not exist as candidate values in FIG. 28. According to an implementation example, 4, 3, and −2 may be included as candidate values in the weight candidate group.

When the candidate values included in the weight candidate group are not in a pair relationship, the prediction encoder 3010 may select which ones of a candidate value selected from among the candidate values and a pair value of the candidate value are respectively applied to the first reference block and the second reference block. More particularly, when preset criterion is satisfied, the prediction encoder 3010 may apply the candidate value to the first reference block and the pair value of the corresponding candidate value to the second reference block. In contrast, when the preset criterion is not satisfied, the prediction encoder 3010 may apply the candidate value to the second reference block and the pair value of the corresponding candidate value to the first reference block.

According to an embodiment, the prediction encoder 3010 may select which ones of the candidate value and the pair value are respectively applied to the first reference block and the second reference block, based on a POC of the first reference image and a POC of the second reference image. For example, the prediction encoder 3010 may apply the candidate value to a reference block in a reference image having a POC having a greater difference from a POC of the current image among the first reference image and the second reference image, and apply the pair value to a reference block in the other reference image. As another example, the prediction encoder 3010 may apply the candidate value to a reference block in a reference image having a POC having a smaller difference from the POC of the current image among the first reference image and the second reference image, and apply the pair value to a reference block in the other reference image. As still another example, the prediction encoder 3010 may apply the candidate value to a reference block in a reference image having a greater POC among the first reference image and the second reference image, and apply the pair value to a reference block in the other reference image. In contrast, the prediction encoder 3010 may apply the candidate value to a reference block in a reference image having a smaller POC among the first reference image and the second reference image, and apply the pair value to a reference block in the other reference image. As another example, the prediction encoder 3010 may apply a greater one of the candidate value and the pair value to a reference block in a reference image having a POC having a smaller difference from the POC of the current image among the first reference image and the second reference image, and apply the pair value to a reference block in the other reference image, and apply a smaller one of the candidate value and the pair value to a reference block in a reference image having a POC having a greater difference from the POC of the current image among the first reference image and the second reference image. As still another example, the prediction encoder 3010 may apply a greater one of the candidate value and the pair value to a reference block in a reference image having a POC having a greater difference from the POC of the current image among the first reference image and the second reference image, and apply the pair value to a reference block in the other reference image, and apply a smaller one of the candidate value and the pair value to a reference block in a reference image having a POC having a smaller difference from the POC of the current image among the first reference image and the second reference image.

The entropy encoder 3030 may perform entropy encoding on information transferred from the prediction encoder 3010. As described above, the information transferred from the prediction encoder 3010 may include at least one of a prediction mode of a current block, information indicating a reference image, information indicating a motion vector, residual data between a prediction block and the current block, and a weight index.

The entropy encoder 3030 may binarize the weight index for entropy encoding of the weight index, perform arithmetic encoding on a first binary value of a binary string corresponding to the weight index according to a context model, and perform arithmetic encoding on the remaining binary values according to a bypass method.

The entropy encoder 3030 will be described in detail with reference to FIG. 31.

Figure 31:
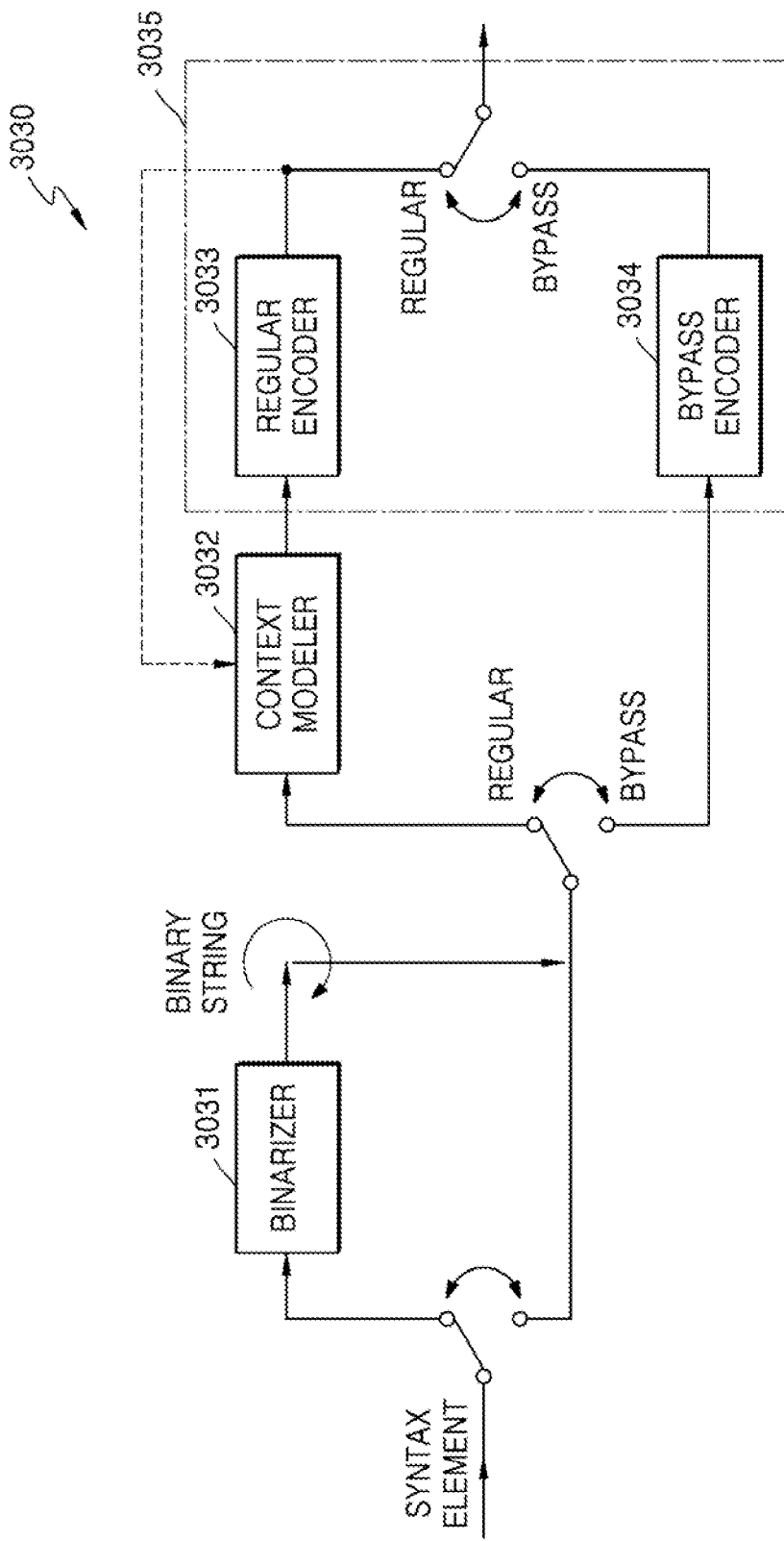
FIG. 31 illustrates a configuration of an entropy encoder shown in FIG. 30.

FIG. 31 illustrates a configuration of the entropy encoder 3030 according to an embodiment.

Referring to FIG. 31, the entropy encoder 3030 according to an embodiment may include a binarizer 3031, a context modeler 3032, and a binary arithmetic coder 3035. The binary arithmetic coder 3025 may include a regular encoder 3033 and a bypass encoder 3034.

Because syntax elements (information transferred from the prediction encoder 3010) input to the entropy encoder 3030 may be not binary values, the binarizer 3031 may binarize the syntax elements and output a binary string configured with binary values of 0 or 1. The binary string may be arithmetically encoded through CABAC.

The binarizer 3031 may apply one of fixed length binarization, truncated rice binarization, k-th order exp-Golomb binarization, and Golomb-rice binarization according to types of the syntax elements to transform values of the syntax elements to binary values of 0 and 1. According to an embodiment, the binarizer 3031 may binarize the weight index by the Truncated Rice binarization.

The binary values output from the binarizer 3031 may be arithmetically encoded by the regular encoder 3033 or the bypass encoder 3034. Which one of the regular encoder 3033 or the bypass encoder 3034 will encode the binary values may be determined according to the types of the syntax elements.

The regular encoder 3033 may perform arithmetic encoding on the binary values based on a probability model determined by the context modeler 3032. The context modeler 3032 may provide a probability model for a current binary value to the regular encoder 3033. More particularly, the context modeler 3032 may determine a probability of a preset binary value based on a previously encoded binary value, update a probability of a binary value used to encode the previous binary value, and output the updated probability to the regular encoder 3033.

According to an embodiment, the context modeler 3032 may determine a context model by using a context index ctxIdx, and determine an occurrence probability of an LPS or an MPS of the context model and information valMPS about which one of 0 and 1 corresponds to the MPS. According to another embodiment, the context modeler 3032 may determine a probability (P(1) representing an occurrence probability of, for example, "1") of a predetermined, preset binary value, based on previously decoded binary values, without distinguishing an MPS from an LPS, based on previously encoded binary values, and provide the probability of the preset binary value to the regular encoder 3033.

The regular encoder 3033 may perform binary arithmetic encoding based on the probability of the preset binary value provided from the context modeler 3032 and a binary value that is to be currently encoded. More specifically, the regular encoder 3033 may determine an occurrence probability P(1) of "1" and an occurrence probability P(0) of "0" based on the probability of the preset binary value provided from the context modeler 3032. Also, the regular encoder 3033 may split a preset range representing a probability section according to the occurrence probabilities P(0) and P(1) of "0" and "1", and output a binary value of a representative value belonging to a split section corresponding to the binary value that is to be currently encoded to thereby perform binary arithmetic encoding.

The bypass encoder 3034 may fix the occurrence probability P(1) of "1" and the occurrence probability P(0) of "0"

to a predetermined value, for example, 0.5, split a preset range representing a probability section according to the occurrence probabilities P(0) and P(1), and output a binary value of a representative value belonging to a split section corresponding to a binary value that is to be currently encoded. The bypass encoder 3034 may perform high-speed arithmetic encoding because of using no context model, unlike the regular encoder 3033.

According to an embodiment, the entropy encoder 3030 may perform, upon entropy encoding of a weight index, arithmetic encoding on a first binary value of binary values corresponding to the weight index based on a context model, and perform arithmetic encoding on the remaining binary values by a bypass method. In other words, a first binary value of a binary string corresponding to the weight index may be arithmetically encoded by the regular encoder 3033, and the remaining binary values may be arithmetically encoded by the bypass encoder 3034. The reason may be because i) when a selection probability of a candidate value indicated by a weight index 0 is highest, it is efficient to arithmetically encode a first binary value by accumulating changes of a probability of 0 and a probability of 1 according to a context model, and ii) because selection probabilities of candidate values indicated by other weight indexes except for 0 are lower than the selection probability of the candidate value indicated by the weight index 0, and accordingly, it is more efficient to arithmetically encode binary values by the bypass method than to reconstruct the binary values based on a context model.

Referring to FIG. 23, it is seen that a binary value (that is, a first binary value) having binIdx of 0 among binary values of Bcw_idx representing weight indexes is encoded according to context of 0, and binary values having binIdx that is greater than 0 are encoded by the bypass method.

The generator 3050 may generate a bitstream including data output from the entropy encoder 3030. As described above, the bitstream may include information to be used to reconstruct the current block.

Figure 32:
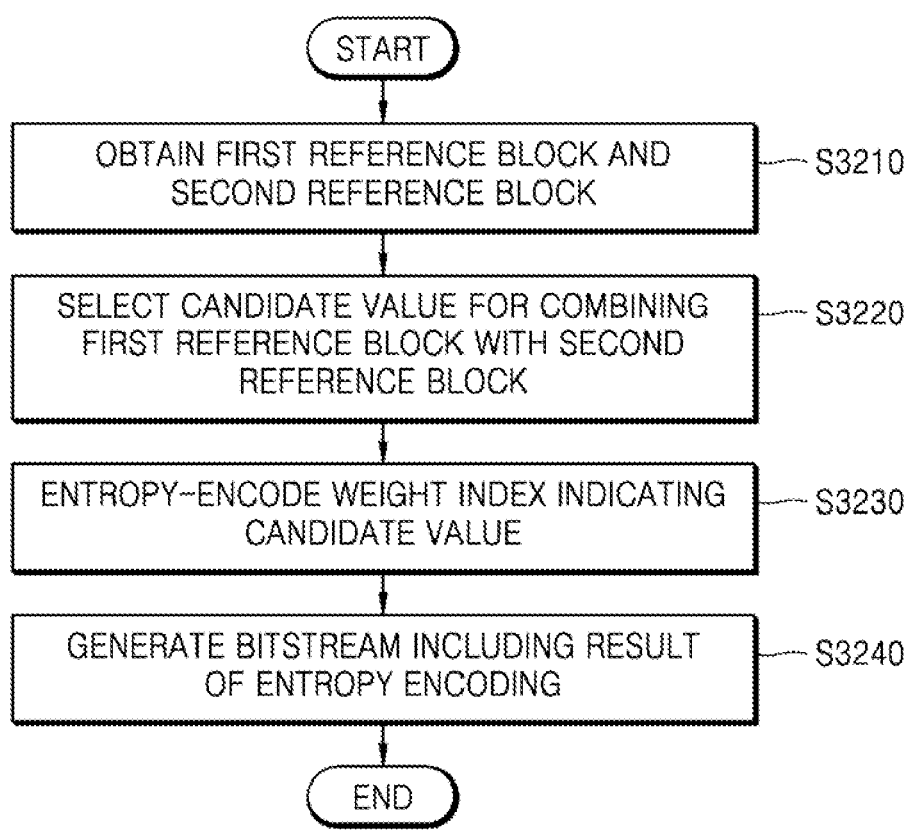
FIG. 32 is a flowchart illustrating an image encoding method according to an embodiment.

FIG. 32 is a flowchart illustrating an image encoding method according to an embodiment.

In operation S3210, the image encoding apparatus 3000 may obtain a first reference block in a first reference image and a second reference block in a second reference image for bi-directional prediction of a current block. The image encoding apparatus 3000 may select the first reference image included in a list 0 and the second reference image included in a list 1, and determine a first motion vector indicating the first reference block in the first reference image and a second motion vector indicating the second reference block in the second reference image.

In operation S3220, the image encoding apparatus 3000 may select a candidate value that is to be used to combine the first reference block with the second reference block from among candidate values included in a weight candidate group. To select a candidate value to be applied to the first reference block or the second reference block, the image encoding apparatus 3000 may adaptively determine the numbers and/or kinds of candidate values to be included in a weight candidate group for each image, each slice, each tile, or each block.

In operation S3230, the image encoding apparatus 3000 may perform entropy encoding on a weight index indicating the candidate value selected from among the candidate values included in the weight candidate group. The image encoding apparatus 3000 may encode a first binary value corresponding to the weight index according to a context model, and encode the remaining binary values according to a bypass method.

In operation S3240, the image encoding apparatus 3000 may generate a bitstream including data generated as a result of the entropy encoding. The bitstream may further include at least one of information representing a prediction mode of the current block, information indicating a reference image, information indicating a motion vector, and residual data, in addition to weight information obtained as the result of arithmetic encoding on the weight index.

Meanwhile, the embodiments of the disclosure may be written as programs that are executable on a computer, and the programs may be stored in a medium or a computer program product.

The medium or the computer program product may continuously store the computer-executable programs, or temporarily store the computer-executable programs for execution or downloading. Also, the medium or the computer program product may be any one of various recording media or storage media in which a single piece or plurality of pieces of hardware are combined, and the medium or the computer program product is not limited to those directly connected to a certain computer system, but may be distributed on a network. Examples of the medium or the computer program product include magnetic media (e.g., a hard disk, a floppy disk, and a magnetic tape), optical recording media (e.g., compact disc-read only memory (CD-ROM) and a digital versatile disc (DVD)), magneto-optical media (e.g., a floptical disk), read only memory (ROM), random access memory (RAM), a flash memory, etc., which are configured to store program instructions. Also, other examples of the medium or the computer program product include recording media and storage media managed by application stores distributing applications or by websites, servers, and the like supplying or distributing other various types of software.

So far, the technical idea of the disclosure has been described based on the preferred embodiments, however, the technical idea of the disclosure is not limited to the above-described embodiments, and various modifications and changes are possible within the scope of the technical idea of the disclosure by persons of ordinary skill in the art.

The invention claimed is:

1. An image decoding method using bi-prediction, the image decoding method comprising:
    obtaining, from a bitstream, a weight index and residual data for a current block;
    obtaining a first prediction block by using a first reference image, and obtaining a second prediction block by using a second reference image, for bi-prediction of the current block;
    obtaining a third prediction block by combining the first prediction block with the second prediction block according to a candidate value indicated by the weight index among candidate values included in a weight candidate group; and
    reconstructing the current block by using the third prediction block and the residual data,
    wherein a first binary value corresponding to the weight index is entropy-decoded based on a context model,
    wherein a remaining binary value corresponding to the weight index is entropy-decoded by a bypass method, and
    wherein a number of candidate values indicatable by the weight index in the weight candidate group when a picture order count (POC) of the first reference image and a POC of the second reference image are smaller than or equal to a POC of a current image is larger than a number of candidate values indicatable by the weight index in the weight candidate group when the POC of the first reference image and the POC of the second reference image are greater than the POC of the current image.

2. An image encoding method using bi-prediction, the image encoding method comprising:

obtaining a first prediction block by using a first reference image, and obtaining a second prediction block by using a second reference image, for bi-prediction of a current block;

selecting a candidate value for combining the first prediction block with the second prediction block from among candidate values included in a weight candidate group;

obtaining a third prediction block by combining the first prediction block with the second prediction block according to the selected candidate value;

obtaining residual data by using the third prediction block and the current block;

performing entropy encoding on a weight index indicating the selected candidate value; and generating a bitstream including the entropy-encoded weight index, and the residual data, wherein a first binary value corresponding to the weight index is entropy-encoded based on a context model, wherein a remaining binary value corresponding to the weight index is entropy-encoded by a bypass method, and wherein a number of candidate values indicatable by the weight index in the weight candidate group when a picture order count (POC) of the first reference image and a POC of the second reference image are smaller than or equal to a POC of a current image is larger than a number of candidate values indicatable by the weight index in the weight candidate group when the POC of the first reference image and the POC of the second reference image are greater than the POC of the current image.

3. A non-transitory computer-readable medium for recording a bitstream, the bitstream comprising:

an entropy-encoded weight index; and residual data, wherein the residual data is obtained by:

obtaining a first prediction block by using a first reference image, and obtaining a second prediction block by using a second reference image, for bi-prediction of a current block;

selecting a candidate value for combining the first prediction block with the second prediction block from among candidate values included in a weight candidate group;

obtaining a third prediction block by combining the first prediction block with the second prediction block according to the selected candidate value; and obtaining the residual data by using the third prediction block, and the current block, wherein a first binary value corresponding to a weight index indicating the selected candidate value is entropy-encoded based on a context model, wherein a remaining binary value corresponding to the weight index is entropy-encoded by a bypass method, and wherein a number of candidate values indicatable by the weight index in the weight candidate group when a picture order count (POC) of the first reference image and a POC of the second reference image are smaller than or equal to a POC of a current image is larger than a number of candidate values indicatable by the weight index in the weight candidate group when the POC of the first reference image and the POC of the second reference image are greater than the POC of the current image.

* * * * *